United States Patent
Kotabe et al.

(10) Patent No.: US 8,185,056 B2
(45) Date of Patent: May 22, 2012

(54) LOAD TESTING SYSTEM, LOAD TESTING APPARATUS, LOAD TESTING METHOD, COMPUTER PRODUCT, AND COMMUNICATION DEVICE

(75) Inventors: Shigeru Kotabe, Fukuoka (JP); Eitatsu Yoshida, Fukuoka (JP); Yoshihiko Koga, Fukuoka (JP); Wataru Nakamura, Fukuoka (JP); Wataru Nakashima, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 631 days.

(21) Appl. No.: 12/275,845

(22) Filed: Nov. 21, 2008

(65) Prior Publication Data
US 2009/0143020 A1 Jun. 4, 2009

(30) Foreign Application Priority Data
Nov. 30, 2007 (JP) ................................. 2007-311410

(51) Int. Cl.
*H04B 17/00* (2006.01)
(52) U.S. Cl. .................................. 455/67.11; 455/67.14
(58) Field of Classification Search ............... 455/67.11, 455/67.14
See application file for complete search history.

(56) References Cited

U.S. PATENT DOCUMENTS
2005/0210515 A1* 9/2005 Roh et al. ......................... 725/81

FOREIGN PATENT DOCUMENTS

| JP | 62-237851 | 10/1987 |
|---|---|---|
| JP | 5-292114 | 11/1993 |
| JP | 11-346232 | 12/1999 |
| JP | 2003-69628 | 3/2003 |
| JP | 2004-56322 | 2/2004 |
| JP | 2005-269170 | 9/2005 |
| JP | 2006-94088 | 4/2006 |

OTHER PUBLICATIONS

Notice of Rejection dated Jan. 12, 2010, from the corresponding Japanese Application.
Notice of Rejection dated Nov. 27, 2009, from the corresponding Japanese Application.

* cited by examiner

*Primary Examiner* — Lincoln Donovan
*Assistant Examiner* — Shikha Goyal
(74) *Attorney, Agent, or Firm* — Katten Muchin Rosenman LLP

(57) ABSTRACT

In a load testing system, a transmission device measures a bandwidth of user data transmitted from a user terminal in real time, calculates a calculation bandwidth by subtracting the bandwidth of the user data from an evaluation bandwidth preset to evaluate the performance of a network, and transmits test data corresponding to the calculation bandwidth with the user data corresponding to the bandwidth of the user data. A reception device receives the user data and the test data transmitted with the user data, and evaluates the performance of the network based on the user data and test data.

8 Claims, 18 Drawing Sheets

FIG.4

| TOP ADDRESS | FRAME LENGTH (NUMBER OF BYTES) | Rcv Time |
|---|---:|---:|
| 0x00000000 | 100 | 0 |
| 0x00000100 | 100 | 190 |
| 0x00000200 | 1000 | 1000 |
| 0x00001200 | 300 | 2800 |
| 0x00001500 | 1500 | 3500 |

FIG.5

| | TOP ADDRESS | FRAME LENGTH (NUMBER OF BYTES) | Rcv Time | End Time |
|---:|---|---:|---:|---:|
| Frame A: | 0x00000000 | 100 | 0 | 100 |
| EXTRA BANDWIDTH 1: | | 90 | 100 | 190 |
| Frame B: | 0x00000100 | 100 | 190 | 290 |
| EXTRA BANDWIDTH 2: | | 710 | 290 | 1000 |
| Frame C: | 0x00000200 | 1000 | 1000 | 2000 |
| EXTRA BANDWIDTH 3: | | 800 | 2000 | 2800 |
| Frame D: | 0x00001200 | 300 | 2800 | 3100 |
| EXTRA BANDWIDTH 4: | | 400 | 3100 | 3500 |
| Frame E: | 0x00001500 | 1500 | 3500 | 5000 |

LOAD TESTING SYSTEM, LOAD TESTING APPARATUS, LOAD TESTING METHOD, COMPUTER PRODUCT, AND COMMUNICATION DEVICE

CROSS-REFERENCE TO RELATED APPLICATIONS

This application is based upon and claims the benefit of priority of the prior Japanese Patent Application No. 2007-311410, filed on Nov. 30, 2007, the entire contents of which are incorporated herein by reference.

BACKGROUND

1. Field

The present invention relates to a technology for evaluating network performance.

2. Description of the Related Art

There has been an active evaluation method that evaluates the performance of a network by actually circulating test data (packet) with respect to the network to be evaluated, intended to evaluate the performance (such as packet loss rate) of the network.

For example, in active evaluation, as illustrated in FIG. 20, a transmission device and a reception device are disposed as a measurement device (e.g., probe and server), at any measurement location in the network that the performance is evaluated. Between the transmission device and the reception device, the transmission device actively generates and transmits test data, and the reception device then receives the transmitted test data and evaluates the performance of the network.

Japanese Laid-open Patent Publication No. 2005-269170 discloses a conventional technology of measuring transmission quality of voice packet in the internet protocol (IP) phone network by an active evaluation.

In the conventional technology, as described below, active evaluation cannot be performed without incurring a negative impact on the actual network operation.

FIG. 20 is a schematic diagram for explaining the conventional technology. For example, as illustrated in FIG. 20, if the conventional active evaluation is performed on the network actually being operated, a negative impact such as discarding of real data is incurred on the service actually being operated. Giving a specific example, when the maximum bandwidth of a network is exceeded by test data (packet) generated by the conventional active evaluation, real data is discarded. In the conventional active evaluation, the evaluation needs to be carried out, while the service in operation is stopped (e.g., by temporarily stopping the service). Accordingly, monitoring cannot be performed periodically while the service is in operation. With the conventional technology, active evaluation is not performed without incurring a negative impact on the actual network operation.

SUMMARY

It is an object of the present invention to at least partially solve the problems in the conventional technology.

According to an aspect of an embodiment, there is provided a load testing system including: a transmission device that transmits test data used to evaluate performance of a network that relays user data transmitted from a user terminal; and a reception device that receives the test data from the transmission device and evaluates the performance of the network. The transmission device includes: a bandwidth measuring unit that measures a bandwidth of the user data transmitted from the user terminal in real time, a calculating unit that calculates a calculation bandwidth by subtracting the bandwidth of the user data measured by the bandwidth measuring unit from an evaluation bandwidth preset to evaluate the performance of the network, and a transmitting unit that transmits the test data corresponding to the calculation bandwidth calculated by the calculating unit with the user data corresponding to the bandwidth of the user data used by the calculating unit. The reception device includes: a receiving unit that receives the user data and the test data transmitted with the user data from the transmitting unit, and an evaluating unit that evaluates the performance of the network based on the user data and the test data received by the receiving unit.

According to another aspect of an embodiment, there is provided a method of load testing with a transmission device that transmits test data used to evaluate performance of a network that relays user data transmitted from a user terminal, and a reception device that receives the test data from the transmission device and evaluates the performance of the network, the method including: in the transmission device, measuring a bandwidth of the user data transmitted from the user terminal in real time; calculating a calculation bandwidth by subtracting the bandwidth of the user data from an evaluation bandwidth preset to evaluate the performance of the network, and transmitting the test data corresponding to the calculation bandwidth with the user data corresponding to the bandwidth of the user data used at the calculating, and, in the reception device, receiving the user data and the test data transmitted with the user data from the transmission device, and evaluating the performance of the network based on the user data and the test data received at the receiving.

According to still another aspect of the embodiment, there is provided a computer program product that implements the above method on a computer.

According to still another aspect of the embodiment, there is provided a load testing apparatus that transmits test data used to evaluate performance of a network that relays user data transmitted from a user terminal, and receives test data to evaluate the performance of the network, including: a receiving unit that receives the user data and the test data transmitted with the user data; an evaluating unit that evaluates the performance of the network based on the user data and the test data received by the receiving unit; a bandwidth measuring unit that measures a bandwidth of the user data transmitted from the user terminal and received by the receiving unit in real time; a calculating unit that calculates a calculation bandwidth by subtracting the bandwidth of the user data measured by the bandwidth measuring unit from an evaluation bandwidth preset to evaluate the performance of the network; and a transmitting unit that transmits the test data corresponding to the calculation bandwidth calculated by the calculating unit with the user data corresponding to the bandwidth of the user data used by the calculating unit.

According to still another aspect of the embodiment, there is provided a load testing apparatus that transmits test data used to evaluate performance of a network that relays user data transmitted from a user terminal to a reception device that receives the test data to evaluate the performance of the network, including: a bandwidth measuring unit that measures a bandwidth of the user data transmitted from the user terminal in real time; a calculating unit that calculates a calculation bandwidth by subtracting the bandwidth of the user data measured by the bandwidth measuring unit from an evaluation bandwidth preset to evaluate the performance of the network; and a transmitting unit that transmits the test data corresponding to the calculation bandwidth calculated by the calculating unit with the user data corresponding to the bandwidth of the user data used by the calculating unit.

According to still another aspect of the embodiment, there is provided a communication device that transmits user data transmitted from a user terminal to a network that relays the user data, including: a bandwidth measuring unit that measures a bandwidth of the user data transmitted from the user terminal in real time; a calculating unit that calculates a calculation bandwidth by subtracting the bandwidth of the user data measured by the bandwidth measuring unit from an evaluation bandwidth preset to evaluate performance of the network; and a transmitting unit that transmits test data corresponding to the calculation bandwidth calculated by the calculating unit and used to evaluate the performance of the network with the user data corresponding to the bandwidth of the user data used by the calculating unit.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 4 is a schematic diagram of an example of information stored in a control table according to the first embodiment;

FIG. 5 is a schematic diagram of an example of information stored in an extra bandwidth table according to the first embodiment;

DETAILED DESCRIPTION OF THE PREFERRED EMBODIMENTS

Exemplary embodiments of the present invention are described below in detail with reference to the accompanying drawings. In the following, terms used herein, outline and characteristics of a load testing system, and configuration and operation of the load testing system according to the embodiments will be described in this order.

Terms used herein will be described with reference to FIG. 1. The term "user terminal" as used herein refers to any of a device that transmits data, a device that receives data, and a device that transmits and receives data. For example, a personal computer (PC) that transmits and receives user data (packets and frames) via a network, a server, a router, and a switch correspond thereto.

The term "user data" as used herein refers to data transmitted from a user terminal, and for example, corresponds to data actually used by the user terminal (meaningful data for the user terminal and data used for service operated on the network). If the user data is discarded, a negative impact is exerted on the service operated on the network.

The term "test data" as used herein refers to data used to evaluate the performance of a network. For example, the test data corresponds to data used to evaluate the performance of the network by a transmission device according to the embodiments.

A relationship between the "user data" and the "test data" in the embodiments will now be defined. If the "user data" is discarded, it gives a negative impact on the service operated on the network. However, the "test data" does not give any negative impact on the service operated on the network, even if it is discarded.

The network in the first embodiment relays data based on the priority of data. For example, priorities are set for the "user data" and the "testing data", respectively. Giving specific examples, a type of service (TOS) field in an IP packet, and a quality of service (QoS) field in a virtual local area network (VLAN) tag correspond thereto.

A "transmission device" in the first embodiment transmits test data used to evaluate the performance of a network with respect to the network that relays user data transmitted from a user terminal. A "reception device" in the first embodiment evaluates the performance of the network by receiving the test data from the transmission device.

Figure 1:
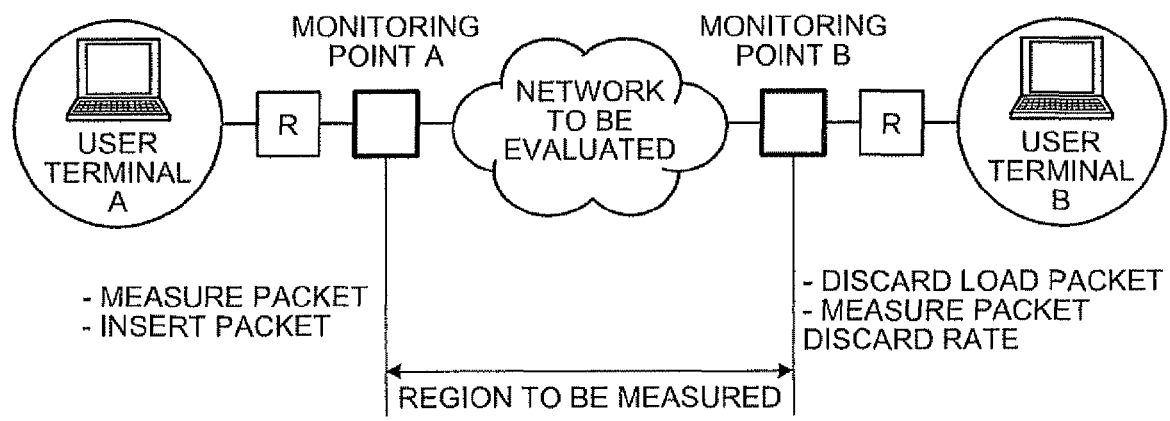
FIG. 1 is a schematic diagram for explaining terms used herein.

With reference to FIG. 1, a positional relationship between the "transmission device" and the "reception device" in the first embodiment will be described. For example, as illustrated in FIG. 1, a user terminal A transmits user data to a user terminal B via a network. If a network to be evaluated is the network between a monitoring point A and a monitoring point B, the transmission device is set at the monitoring point A, and the reception device is set at the monitoring point B.

Outline and Characteristics of Load Testing System

Figure 2:
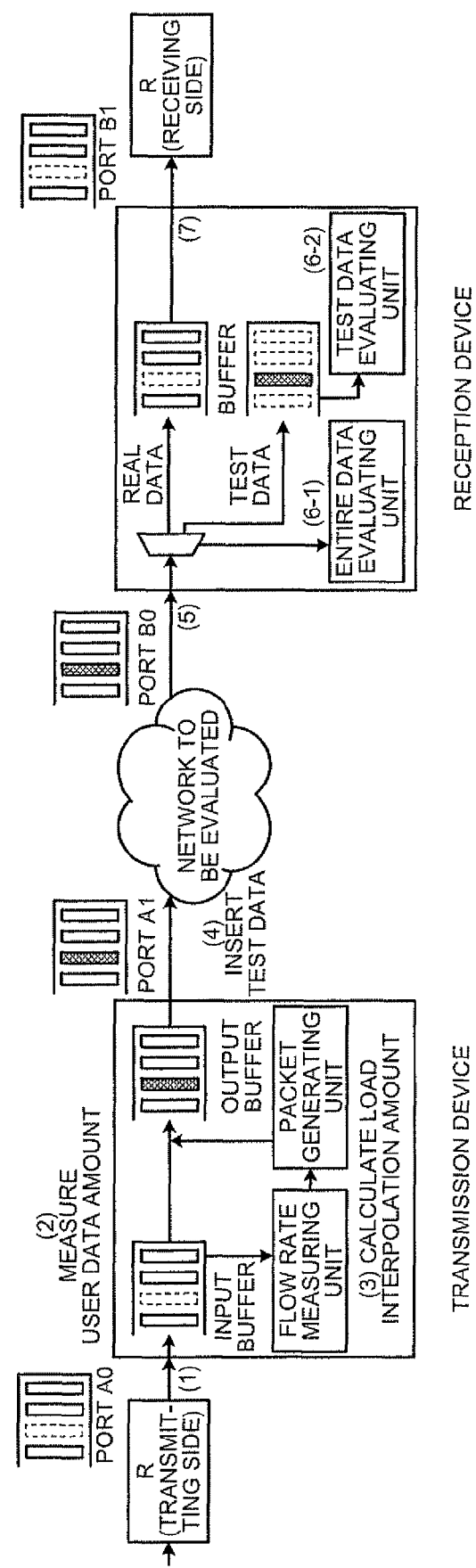
FIG. 2 is a schematic diagram for explaining an outline and characteristics of a load testing system according to the first embodiment.

With reference to FIG. 2, outline and characteristics of a load testing system according to the first embodiment will be described. FIG. 2 is a schematic diagram for explaining an outline and characteristics of the load testing system according to the first embodiment.

As illustrated in FIG. 2, the load testing system according to the first embodiment includes a transmission device and a reception device. As described below, the characteristic of the load testing system is to perform active evaluation without incurring a negative impact on the actual network operation.

In the load testing system according to the first embodiment, the transmission device, as indicated by (1) in FIG. 2, receives user data (in FIG. 2, referred to as data transmitted via a router (R)) transmitted by the user terminal, from a port A0.

Then, as indicated by (2) in FIG. 2, in the load testing system according to the first embodiment, a flow rate measuring unit of the transmission device measures the bandwidth of the user data transmitted from the user terminal in real time. For example, the transmission device according to the first embodiment stores therein the received user data in an input buffer once, and at that time, measures and records the data size (e.g., frame length) of the received user data and the timing when the user data is received, at real time (continuously). The flow rate measuring unit of the transmission device according to the first embodiment then measures the bandwidth (hereinafter, "measurement bandwidth") of the user data received within a certain period of time. Giving a specific example, the flow rate measuring unit of the transmission device according to the first embodiment measures the measurement bandwidth of 30 Mbps.

As indicated by (3) in FIG. 2, in the load testing system according to the first embodiment, the flow rate measuring unit of the transmission device calculates a calculation bandwidth by subtracting the bandwidth of the user data measured by the bandwidth measuring unit from an evaluation bandwidth that is a bandwidth preset to evaluate the performance of the network. In other words, in the load testing system according to the first embodiment, an amount of load interpolation is calculated. More specifically, the flow rate measuring unit in the transmission device calculates a calculation bandwidth that is a bandwidth for data required to transmit by adding to the user data, to evaluate the performance of the network in the evaluation bandwidth. For example, the flow rate measuring unit of the transmission device according to the first embodiment calculates the calculation bandwidth by subtracting the measurement bandwidth measured in (2) in FIG. 2, from the evaluation bandwidth. Giving a specific example, if the evaluation bandwidth is 80 Mbps, the flow rate measuring unit of the transmission device according to the first embodiment calculates that the calculation bandwidth is 50 Mbps.

Then, as indicated by (4) in FIG. 2, in the load testing system according to the first embodiment, the transmission device transmits test data that corresponds to the calculated calculation bandwidth, with the user data that corresponds to the bandwidth of the user data used to calculate the calculation bandwidth. For example, in the transmission device according to the first embodiment, a packet generating unit generates test data that corresponds to the calculation bandwidth calculated in (3) in FIG. 2, and inserts the test data in the received user data at an output buffer. In other words, the packet generating unit, as indicated by (4) in FIG. 2, after inserting the test data to interpolate the load, transmits the test data with the received user data from a port A1. Giving a specific example, the transmission device according to the first embodiment transmits the test data of 50 Mbps, with the user data of 30 Mbps.

The test data inserted into the user data is calculated in (2) in FIG. 2, so as the bandwidth that corresponds to the data to be transmitted becomes the evaluation bandwidth, by being inserted (added) into the user data.

As indicated by (5) in FIG. 2, in the load testing system according to the first embodiment, the reception device receives the user data transmitted by the transmission device and the test data transmitted with the user data. Giving a specific example, the reception device according to the first embodiment receives the user data of 30 Mbps with the test data of 50 Mbps transmitted from the transmission device.

As indicated by (6-1) and (6-2) in FIG. 2, in the load testing system according to the first embodiment, the reception device evaluates the performance of the network using the received user data and the test data. For example, as indicated by (6-1) in FIG. 2, the reception device evaluates the network by using the received user data and the test data. Or, as indicated by (6-2) in FIG. 2, the reception device evaluates the network by only using the test data. Giving a specific example, the reception device according to the first embodiment evaluates throughput, by using the received user data and the test data.

As indicated by (7) in FIG. 2, in the load testing system according to the first embodiment, the reception device transmits only the received user data to the receiving side user terminal. Giving a specific example, the reception device according to the first embodiment transmits only the user data of 30 Mbps transmitted from the transmission device, to the user terminal via a router (in FIG. 2, referred to as R (receiving side)).

In this manner, the load testing system according to the first embodiment can perform active evaluation without incurring a negative impact on the actual network operation. This is enabled because, as the main characteristics, the load testing system according to the first embodiment measures the bandwidth of the user data in real time, calculates the calculation bandwidth from the evaluation bandwidth, and transmits the test data that corresponds to the calculated calculation bandwidth with the user data.

Configuration of Load Testing System

Figure 3:
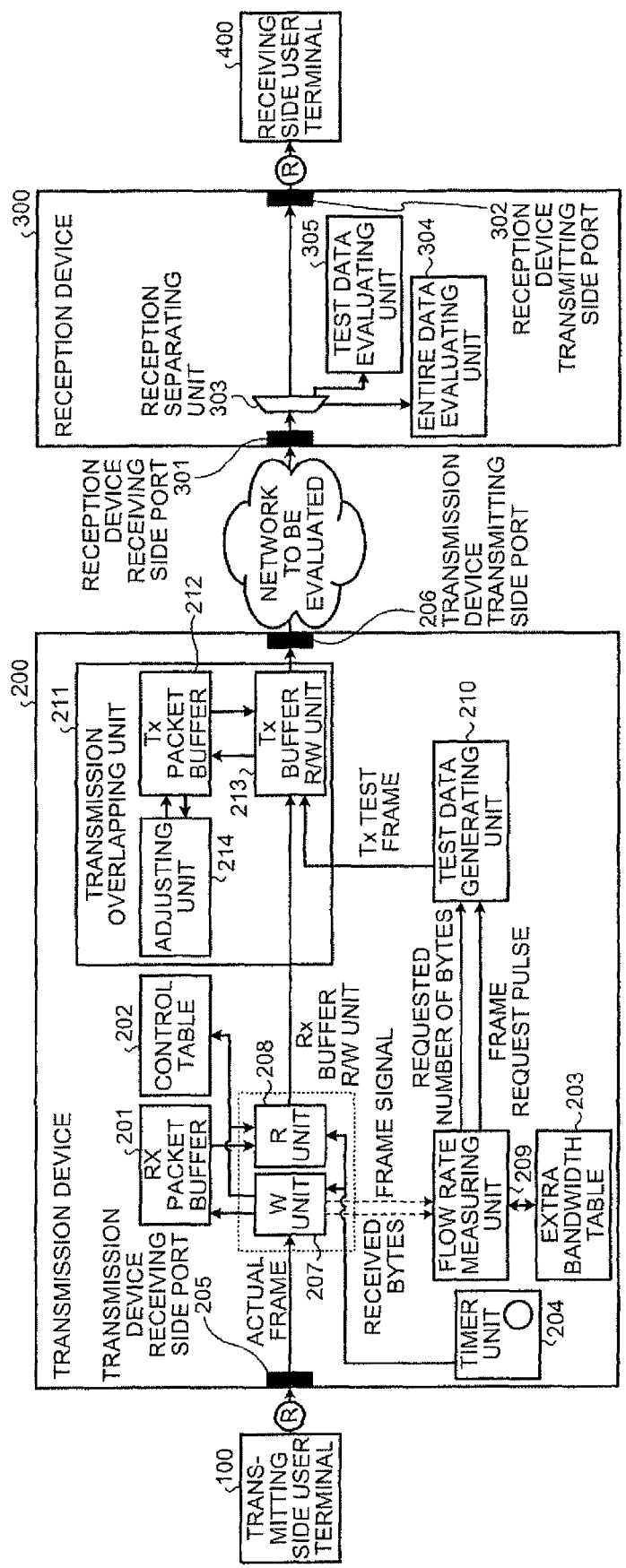
FIG. 3 is a block diagram of the load testing system according to the first embodiment.
Figure 6:
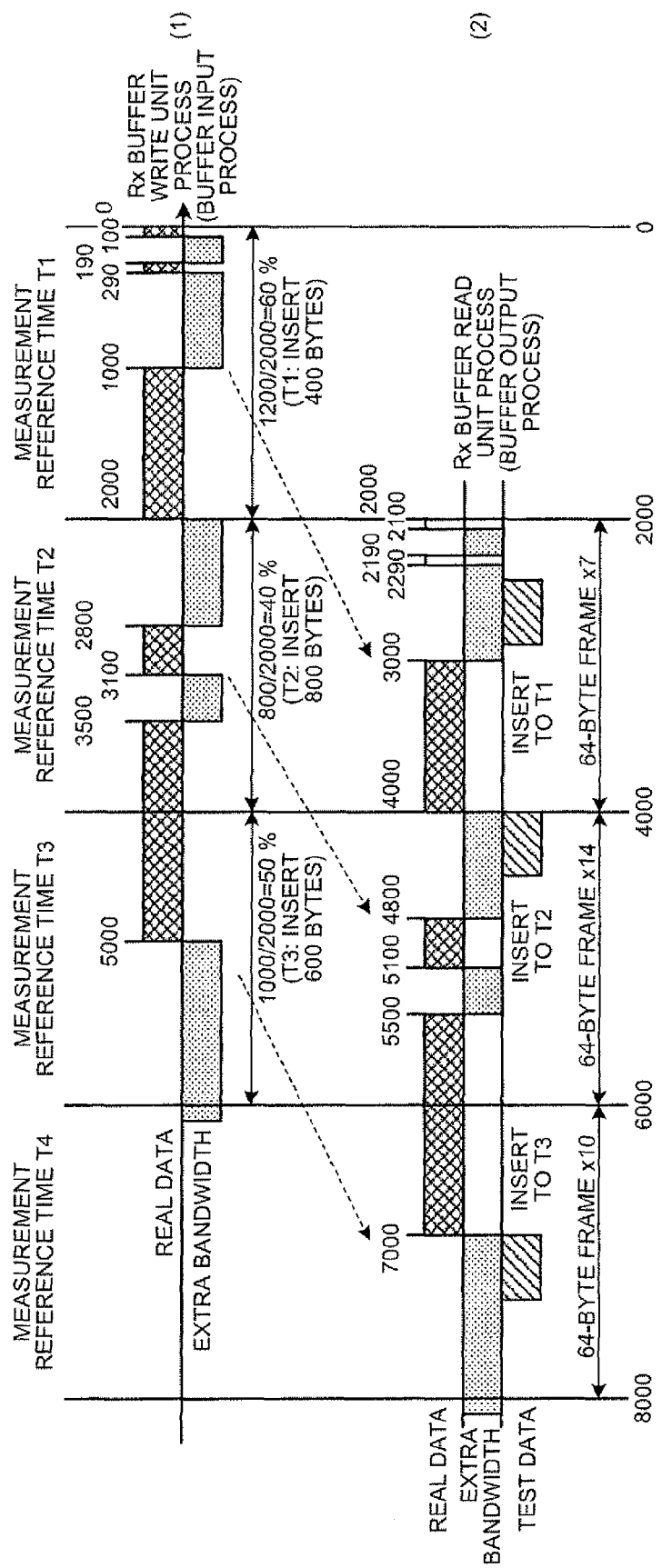
FIG. 6 is an exemplary diagram of a test data insertion process performed by a transmission overlapping unit according to the first embodiment.
Figure 7:
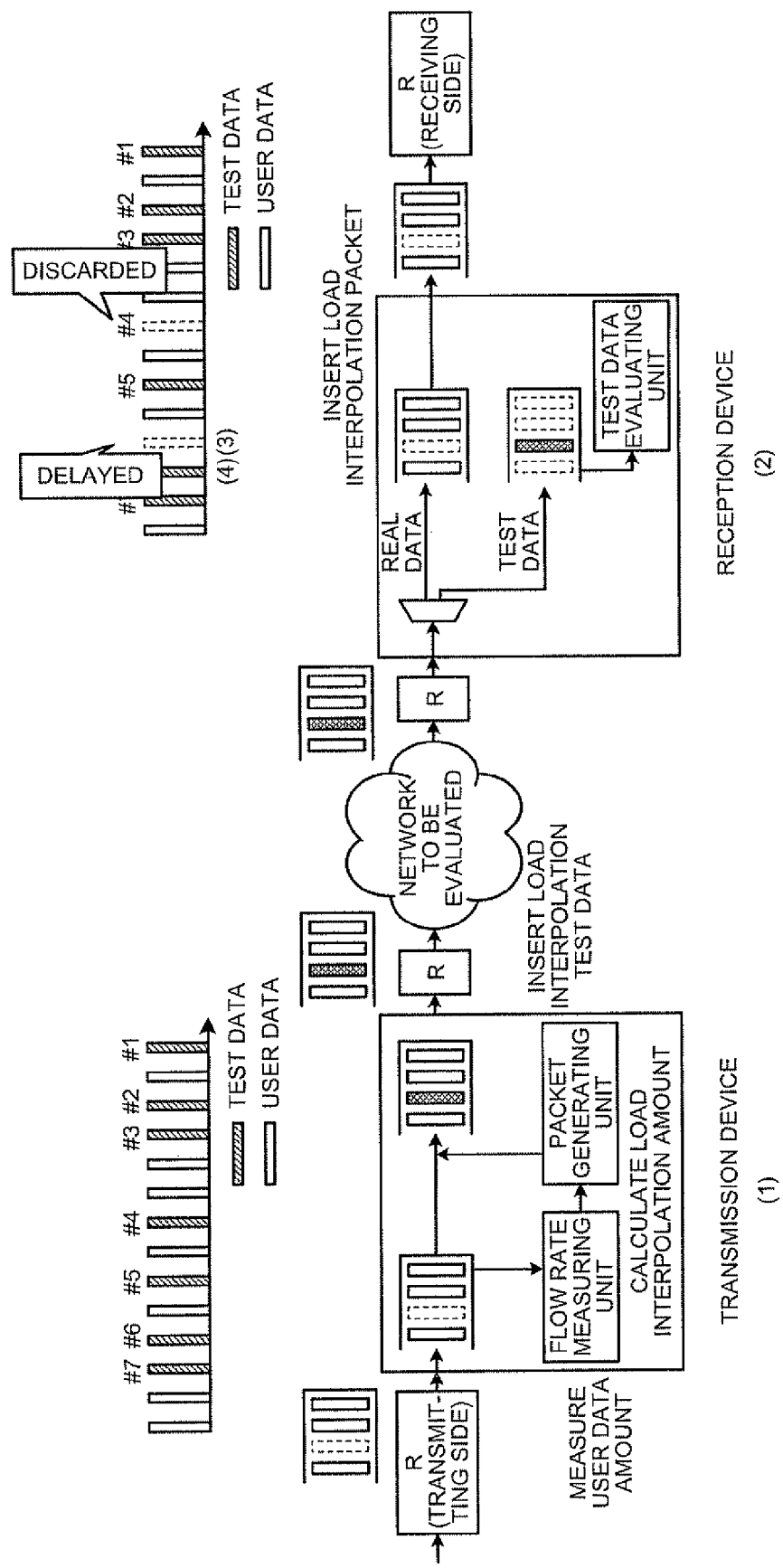
FIG. 7 is an exemplary diagram of an evaluation method performed by a test data evaluating unit according to the first embodiment.

With reference to FIGS. 3 to 7, a configuration of the load testing system illustrated in FIG. 2 will be described. FIG. 3 is a block diagram of the load testing system according to the first embodiment. FIG. 4 is a schematic diagram of an example of information stored in a control table according to the first embodiment. FIG. 5 is a schematic diagram of an example of information stored in an extra bandwidth table according to the first embodiment. FIG. 6 is an exemplary diagram of a test data insertion process performed by a transmission overlapping unit according to the first embodiment. FIG. 7 is an exemplary diagram of an evaluation method performed by a test data evaluating unit according to the first embodiment.

As illustrated in FIG. 3, the load testing system includes a transmission device 200 and a reception device 300. The transmission device 200 is connected to a transmitting side user terminal 100 transmits user data, via a router (in FIG. 3, referred to as "®"). The reception device 300 is connected to a receiving side user terminal 400 receives user data transmitted by the transmitting side user terminal 100, via a router. The transmission device 200 and the reception device 300 are connected via a network. The transmission device 200 functions as a "transmission device", the reception device 300 functions as a "reception device", and the user terminal functions as a "user terminal".

The transmission device 200 includes an RX packet buffer 201, a control table 202, an extra bandwidth table 203, a timer unit 204, a transmission device receiving side port 205, a transmission device transmitting side port 206, a write (W) unit 207, a read (R) unit 208, a flow rate measuring unit 209, a test data generating unit 210, and a transmission overlapping unit 211. The flow rate measuring unit 209 functions as a "bandwidth measuring unit" and a "calculating unit", and the test data generating unit 210, the transmission overlapping unit 211, and the transmission device transmitting side port 206 function as a "transmitting unit". The W unit 207 functions as a "priority changing unit", and the test data generating unit 210 functions as a "priority setting unit" and an "assigning unit".

The RX packet buffer 201 temporarily stores therein user data. For example, the RX packet buffer 201 temporarily stores therein the received user data stored in the W unit, which will be described later, until the user data is read out by the R unit 208, which will be described later.

The control table 202, as illustrated in FIG. 4, stores therein information related to the received user data, and used by the W unit 207 and the R unit 208, which will be described later. For example, as illustrated in FIG. 4, the control table 202 stores therein the "frame length (the number of bytes)" of the received user data and "Rcv Time" that is information that indicates the time when the user data generated by the timer unit 204, which will be described later, is received. This is enabled by associating with a "top address" that indicates the top address in which data is written by the W unit 207, which will be described later, and the received user data is stored in the RX packet buffer 201.

Giving specific examples, as illustrated in FIG. 4, the control table 202 stores therein the number of bytes "100" and the Rcv Time "0" by associating with the top address "0x00000000". The control table 202 also stores therein the number of bytes "100" and the Rcv Time "190", by associating with the top address "0x00000100".

The extra bandwidth table 203 stores therein information related to an extra bandwidth, and used by the flow rate measuring unit 209, which will be described later. For example, the extra bandwidth table 203, as illustrated in FIG. 5, stores therein the "top address", the "frame length (the number of bytes)", the "Rcv Time", and an "End Time" that is information generated by the timer unit 204, which will be described later, and also information related to the time when the reception process of the user data has finished. This is enabled by associating with a "Frame" that is information in which data is written by the flow rate measuring unit 209, which will be described later, and also used to uniquely identify the received user data (frame).

The extra bandwidth table 203 also stores therein information related to an extra bandwidth that is not used for transmitting/receiving the user data. For example, the extra bandwidth table 203, as illustrated in FIG. 5, stores therein the "frame length (the number of bytes)", the "Rcv Time", and the "End Time", by associating with the "extra bandwidth" that is information used to uniquely identify the extra bandwidth.

The "frame length (the number of bytes)", the "Rcv Time", and the "End Time" stored by associating with the "extra bandwidth" are, for example, calculated by the flow rate measuring unit 209, which will be described later, from the "top address", the "frame length (the number of bytes)", the "Rcv Time", and the "End Time" stored by associating with the "Frame".

The timer unit 204 transmits information related to time, to the W unit 207 and the R unit 208, which will be described later. For example, the timer unit 204 transmits time to the W unit 207 and the R unit 208, which will be described later.

The transmission device receiving side port 205 receives input of information, and for example, receives user data from the transmitting side user terminal 100, and transmits the received user data to the W unit 207, which will be described later. The transmission device transmitting side port 206 outputs information, and for example, transmits user data and test data, based on the instruction received from the transmission overlapping unit 211, which will be described later.

The W unit 207 stores the received user data in the RX packet buffer 201 and stores the information related to the received user data in the control table 202. For example, every time the user data is received by the transmission device receiving side port 205, the W unit 207 stores the user data in the RX packet buffer 201. The W unit 207 stores the "frame length (the number of bytes)" and the "Rcv Time" of the user data in the control table 202, by associating with the "top address". The W unit 207 then notifies the "frame length (the number of bytes)", the "Rcv Time", and the "End Time" to the flow rate measuring unit 209, which will be described later, by associating with the "top address". Describing more specifically, the W unit 207 stores the number of bytes "100" and the Rcv Time "0" in the control table 202, by associating with the top address "0x00000000", if the number of bytes of the received user data is "100", the arrival time is "0", and the top address of the RX packet buffer 201 in which the user data is stored is "0x0000000".

The W unit 207 changes the priority preset in the user data to be transmitted, to a priority higher than the test data. For example, the W unit 207 sets the priority preset by the TOS field in the IP packet, the QoS field in the VLAN tag, and the like to each of the received user data, to a priority higher than the preset priority, when the user data is stored in the RX packet buffer 201. An example is given when the priority is indicated by a number, and the higher the number, the higher the priority. If the priority preset in the user data is "4", the W unit 207 changes the priority to "5", and stores the user data in the RX packet buffer 201.

The R unit 208 reads out the user data stored in the RX packet buffer 201 by the W unit 207. For example, in the R unit 208, measurement reference time that is storage time for calculating a bandwidth (time that the received user data is stored in RX packet buffer 201) is set in advance. The R unit 208 determines whether the measurement reference time has passed from the "Rcv Time" stored in the control table 202 by using the timer unit 204. If the measurement reference time has passed, the R unit 208 reads out the user data by using the "top address" and the "frame length" associated with the "Rcv Time", and transmits the user data to the transmission overlapping unit 211, which will be described later.

The measurement reference time is storage time for calculating a bandwidth, and in a testing device in the present load testing system, the time that the received user data is stored in the RX packet buffer 201. In the present load testing system, the measurement reference time is used as a time interval to measure bandwidth or to transmit data. For example, a bandwidth is measured by using the user data received within the measurement reference time. Because the frame size varies from approximately 60 bytes to approximately 1500 bytes, the measurement reference time is set to the time required to receive a plurality of the frames with varied size and to measure a meaningful bandwidth. It is also possible to adjust the load bandwidth in detail, by reducing (or increasing) the measurement reference time.

The flow rate measuring unit 209 measures the bandwidth of the user data transmitted from the user terminal in real time, for example, in real time (continuously), or at a measurement reference time set in advance). For example, the flow rate measuring unit 209 measures a bandwidth from the user data received within the measurement reference time, at every measurement reference time set in advance. Giving a specific example, the flow rate measuring unit 209 stores the "top address", the "frame length (the number of bytes)", the "Rcv Time", and the "End Time" notified from the W unit 207, in the extra bandwidth table 203. Then, the flow rate measuring unit 209, at every measurement reference time, determines the user data received within the measurement reference time, by using the "Rcv Time" stored in the extra bandwidth table. The flow rate measuring unit 209 then obtains the "frame length" associated with the "Rcv Time" that indicates the user data received within the measurement reference time, and measures the bandwidth of the user data at the measurement reference time.

The flow rate measuring unit 209 measures the extra bandwidth from the "top address", the "frame length (the number of bytes)", the "Rcv Time", and the "End Time" stored in the extra bandwidth table 203, and stores the "frame length (the number of bytes)", the "Rcv Time", and the "End Time" in the extra bandwidth table 203, by associating with the "extra bandwidth".

The flow rate measuring unit 209 calculates a calculation bandwidth by subtracting the bandwidth of the measured user data from an evaluation bandwidth that is a bandwidth preset to evaluate the performance of the network. For example, the flow rate measuring unit 209 calculates the calculation bandwidth (e.g., 20 Mbps) by subtracting the user bandwidth (e.g., 40 Mbps) from the evaluation bandwidth (e.g., 60 Mbps), at every measurement reference time set in advance. The flow rate measuring unit 209 then notifies an instruction to generate test data (e.g., frame request signal), and the calculation bandwidth (e.g., 20 Mbps), at the timing of generating the test data (e.g., at every measurement reference time), to the test packet generating unit, which will be described later.

The test data generating unit 210 generates test data. More specifically, the test data generating unit 210 generates test data based on the instruction received from the flow rate measuring unit 209, and transmits to the transmission overlapping unit 209, which will be described later. For example, the test data generating unit 210, when the instruction to generate test data and the calculation bandwidth (e.g., 20 Mbps) are notified from the flow rate measuring unit 209, generates test data (e.g., 20 Mbps) that corresponds to the calculation bandwidth, and transmits the test data to the transmission overlapping unit 211, which will be described later. Giving a specific example, the test data generating unit 210 generates required test data, by using the smallest frame size.

The reason why the test data generating unit 210 generates test data using the smallest frame size (e.g., 64 bytes) is because, to make the test data insertable into the extra bandwidth (to make test data insertable while maintaining transmission timing of user data) at the transmission overlapping unit 211, which will be described later.

The test data generating unit 210 sets the priority of the test data lower than the priority preset in the user data. For example, the test data generating unit 210 sets the priority set to each set of the test data to be generated by the TOS field in the IP packet, the QoS field in the VLAN tag, and the like, lower than the priority preset in the user data. The test data generating unit 210 sets the priority of the test data lower than the priority changed by the W unit 207. An example is given when the priority is indicated by a number, and the higher the number, the higher the priority. If the minimum priority preset in the user data is "3", the test data generating unit 210 sets the priority of each test data less than "3" (e.g., "2" and "1").

The test data generating unit 210, with respect to each test data, assigns sequence identification information that uniquely identifies the sequence of each set of the test data. For example, the test data generating unit 210 inserts a sequence number to each test data to be generated. Giving specific examples, the test data generating unit 210 assigns sequence identification information such as "#1", "#2", and "#3", to each test data.

The test data generating unit 210, with respect to each test data, assigns time information that is information related to time at which each set of the test data is transmitted. For example, the test data generating unit 210 assigns a time stamp, to each test data to be generated. Giving specific examples, to each test data, the test data generating unit 210 assigns the time at which each set of the test data obtained from the timer unit 204 is transmitted as a time stamp.

In the following, both the sequence identification information and the time information are assigned to one test data. However, the present invention is not limited to this, and the evaluation may be performed by using either of the sequence identification information or the time information.

The transmission overlapping unit 211, as illustrated in FIG. 3, includes a Tx packet buffer 212, a Tx buffer read/write (RW) unit 213, and an adjusting unit 214. The transmission overlapping unit 211 transmits the test data that corresponds to the calculation bandwidth calculated by the flow rate measuring unit 209, with the user data that corresponds to the bandwidth of the user data used by the flow rate measuring unit 209, from the transmission device transmitting side port 206.

The Tx packet buffer 212 temporarily stores therein user data and test data. More specifically, the Tx packet buffer 212 temporarily stores therein user data and test data, until the user data transmitted by the R unit 208 and the test data transmitted by the test data generating unit 210 are written by the Tx buffer RW unit 213, which will be described later, and the user data and the test data are read out and transmitted by the Tx buffer RW unit 213.

The Tx buffer RW unit 213 stores the user data transmitted by the R unit 208 and the test data transmitted by the test data generating unit 210 in the Tx packet buffer 212.

The adjusting unit 214 adjusts the timing of transmitting user data and test data. More specifically, the adjusting unit 214 inserts test data into the extra bandwidth, to transmit the user data transmitted by the R unit 208 with the test data transmitted by the test data generating unit 210. For example, the adjusting unit 214 adjusts the timing of transmitting the user data and the test data stored in the Tx packet buffer 212 by the Tx buffer RW unit 213.

With reference to FIG. 6, a process of adjusting the timing of transmitting the user data with the test data will be explained. In FIG. 6, (1) indicates a writing process of the user data received by the transmission device receiving side port 205 with respect to the RX packet buffer 201. In FIG. 6, (2) indicates a reading process of the user data from the RX packet buffer 201. As an example, a minimum line load (evaluation bandwidth) that includes test load is equal to or more than 80%. It is also defined that the time required to transmit one byte with respect to the line speed is one byte time.

As described above, the transmission device 200 stores therein the received user data, during a measurement reference time T, to measure bandwidth and insert a test frame. The transmission device 200, when a certain period of time T has passed, outputs the received user data, and outputs the test frame in synchronization therewith, so as to be inserted in the same reference time.

For example, in the measurement reference time T1, there are 1200 bytes of real data with respect to the reference time of 2000 byte time of the line bandwidth. Accordingly, the adjusting unit 214 inserts 400 bytes with respect to the segment, as test data (test load frame). Similarly, the adjusting unit 214 inserts 800 bytes with respect to T2, and inserts 600 bytes with respect to T3. On inserting the test data, the adjusting unit 214 may insert a number of sets of short test data (short packets), or may insert the frame by appropriately calculating the frame length based on the load, until the preset load is reached.

In the first embodiment, the user data is transmitted at the timing while maintaining the timing that the user data is received. However, the present invention is not limited to this, and the user data may be transmitted by shifting the timing of transmitting the user data at every measurement reference time. For example, if each extra bandwidth in the measurement reference time does not have sufficient bandwidth to insert the test data generated by the smallest frame, it is possible to obtain a sufficient bandwidth to insert the test data, by shifting the timing of transmitting the user data and collecting each of the extra bandwidths.

In other words, with the data flow in the user data, the extra bandwidth is not necessarily present at a regular interval. Accordingly, the timing to insert the test data may need to be adjusted. Subsequently, the user data and the test data are temporarily stored in the Tx packet buffer 212 in the order of transmission, thereby adjusting the interval.

The Tx buffer RW unit 213 reads out the user data and the test data stored in the Tx packet buffer 212, and transmits from the transmission device transmitting side port 206. For example, the Tx buffer RW unit 213 reads out and transmits the user data and the test data adjusted by the adjusting unit 214 at every measurement reference time. The Tx buffer RW unit 213 reads out and transmits from old data (for example, from data written at first, and data written at first and the timing is adjusted) among the data (user data and test data) stored in the Tx packet buffer 212. In other words, the Tx buffer RW unit 213 reads out and transmits data, while maintaining the sequence that the user data is received.

The Tx buffer RW unit 213 is test data calculated by the flow rate measuring unit 209, and transmits the test data in which priority is set by the test data generating unit 210. For example, the Tx buffer RW unit 213, if the smallest priority set in the user data by the test data generating unit 210 is "3", the test data generating unit 210 transmits the test data in which priority of each test data is set less than "3" (e.g., "2" or "1").

The Tx buffer RW unit 213 is user data that corresponds to the bandwidth of the user data, and transmits the user data in which priority is changed by the W unit 207. For example, if the priority preset in the user data is "4", the Tx buffer RW unit 213 transmits the user data in which priority is changed to "5" by the W unit 207.

The Tx buffer RW unit 213 transmits test data in which sequence identification information is assigned by the test data generating unit 210, with the user data. For example, the Tx buffer RW unit 213 transmits the test data in which sequence identification information such as "#1", "#2", and "#3" is assigned by the test data generating unit 210.

The Tx buffer RW unit 213 transmits the test data in which time information is assigned by the test data generating unit 210, with the user data. For example, the Tx buffer RW unit 213 transmits each test data in which time to transmit each set of the test data is assigned as a time stamp, by the test data generating unit 210.

The reception device 300 includes a reception device receiving side port 301, a reception device transmitting side port 302, a reception separating unit 303, an entire data evaluating unit 304, and a test data evaluating unit 305. The reception device receiving side port 301 functions as a "receiving unit", the reception separating unit 303 functions as a "separating unit", and the entire data evaluating unit 304 and the test data evaluating unit 305 functions as an "evaluating unit".

The reception device receiving side port 301 receives input of information. More specifically, the reception device receiving side port 301 receives the user data transmitted by the transmission device 201 and the test data transmitted with the user data. For example, the reception device receiving side port 301 receives the user data and the test data from the transmission device 200, and transmits the received user data and the test data to the reception separating unit 303, which will be described later. The reception device transmitting side port 302 outputs information, and for example, transmits the user data transmitted from the reception separating unit 303, which will be explained later, to the receiving side user terminal.

The reception separating unit 303 separates the user data and the test data received by the reception device receiving side port 301. For example, a test data identification tag defined in advance in a frame header is assigned to each test data. The reception separating unit 303 determines the data, in which a frame head of each data received by the reception device receiving side port 301 is assigned with the test data identification tag, is test data. The reception separating unit 303 also determines that the data not assigned with the test data identification tag is user data. Accordingly, the user data is separated from the test data.

The reception separating unit 303, between the user data and the test data, transmits the user data to the reception device transmitting side port 302, and transmits the test data to the test data evaluating unit 305, which will be described later. The reception separating unit 303 transmits the user data and the test data received by the reception device receiving side port 301 to the entire data evaluating unit 304, which will be described later.

The entire data evaluating unit 304 evaluates the performance of the network, from the user data and the test data received by the reception device receiving side port 301. More specifically, the entire data evaluating unit 304 evaluates the performance of the network, by both of the user data and the test data received by the reception device receiving side port 301. For example, the entire data evaluating unit 304 evaluates an execution bandwidth in the evaluation bandwidth, by using both of the user data and the test data received by the reception device receiving side port 301.

The test data evaluating unit 305 evaluates the performance of the network, using the test data received by the reception device transmitting side port 301. More specifically, the test data evaluating unit 305 evaluates the performance of the network, only by the test data separated by the reception separating unit 303. For example, the test data evaluating unit 305 obtains a sequence identification number from each test data received by the reception device transmitting side port 301, and evaluates if there is any test data that is not received by the reception device transmitting side port, among the test data transmitted by the transmission device 200. For example, the test data evaluating unit 305 obtains a sequence identification number (sequence number) from each test data being received, and examines if there is any sequence identification number that has not received. Then, the test data evaluating unit 305 detects and evaluates packet loss generated when the test data is relayed through the network.

As indicated by (1) in FIG. 7, an example of when the transmission device 200 transmits test data by assigning "#1 to #7" to each test data to be transmitted as sequence identification information will be described. As indicated by (2) in FIG. 7, the test data evaluating unit 305 obtains the sequence identification information of "#1 to #3 and #5 to #7" assigned to the test data by the transmission device 200, from each test data received by the reception device 300. The test data evaluating unit 305 then determines that the sequence identification information "4" is not obtained, and evaluates that a packet loss has occurred.

The test data evaluating unit 305, with each test data received by the reception device receiving side port 301, evaluates the fluctuations of data arrival interval in the network, from the time information assigned to each set of the test data and the time when each set of the test data is received. For example, the test data evaluating unit 305 obtains the time information from each test data received by the reception device transmitting side port, and obtains the reception time when the test data is received from the timer unit (not shown in FIG. 3) installed in the reception device 300. The test data evaluating unit 305, with each test data being received, compares the time information and the reception time, and detects and evaluates jitter (fluctuation) generated when the test data is relayed through the network.

For example, as illustrated in FIG. 7, the test data evaluating unit 305 obtains the time information from each test data received by the reception device 300 and the time when each set of the test data is received. Accordingly, the test data evaluating unit 305 detects that the test data assigned with the sequence identification information of "#6" is delayed and received as indicated by (4) in FIG. 7, from the timing that should have been received, as indicated by a dotted line portion of (3) in FIG. 7. The test data evaluating unit 305 then evaluates that jitter has occurred.

Figure 8:
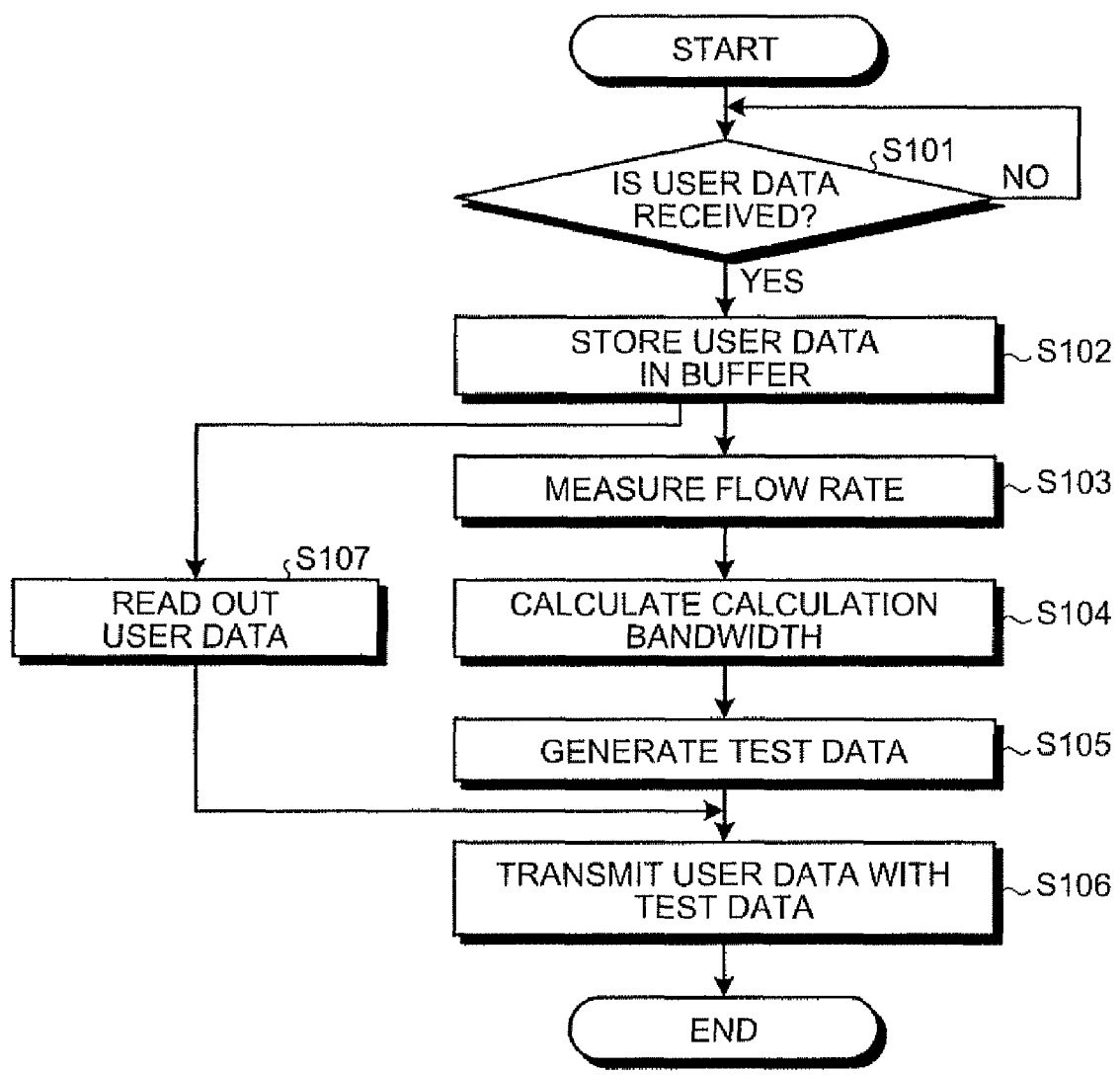
FIG. 8 is a flowchart of an example of the entire process performed by a transmission device according to the first embodiment.
Figure 9:
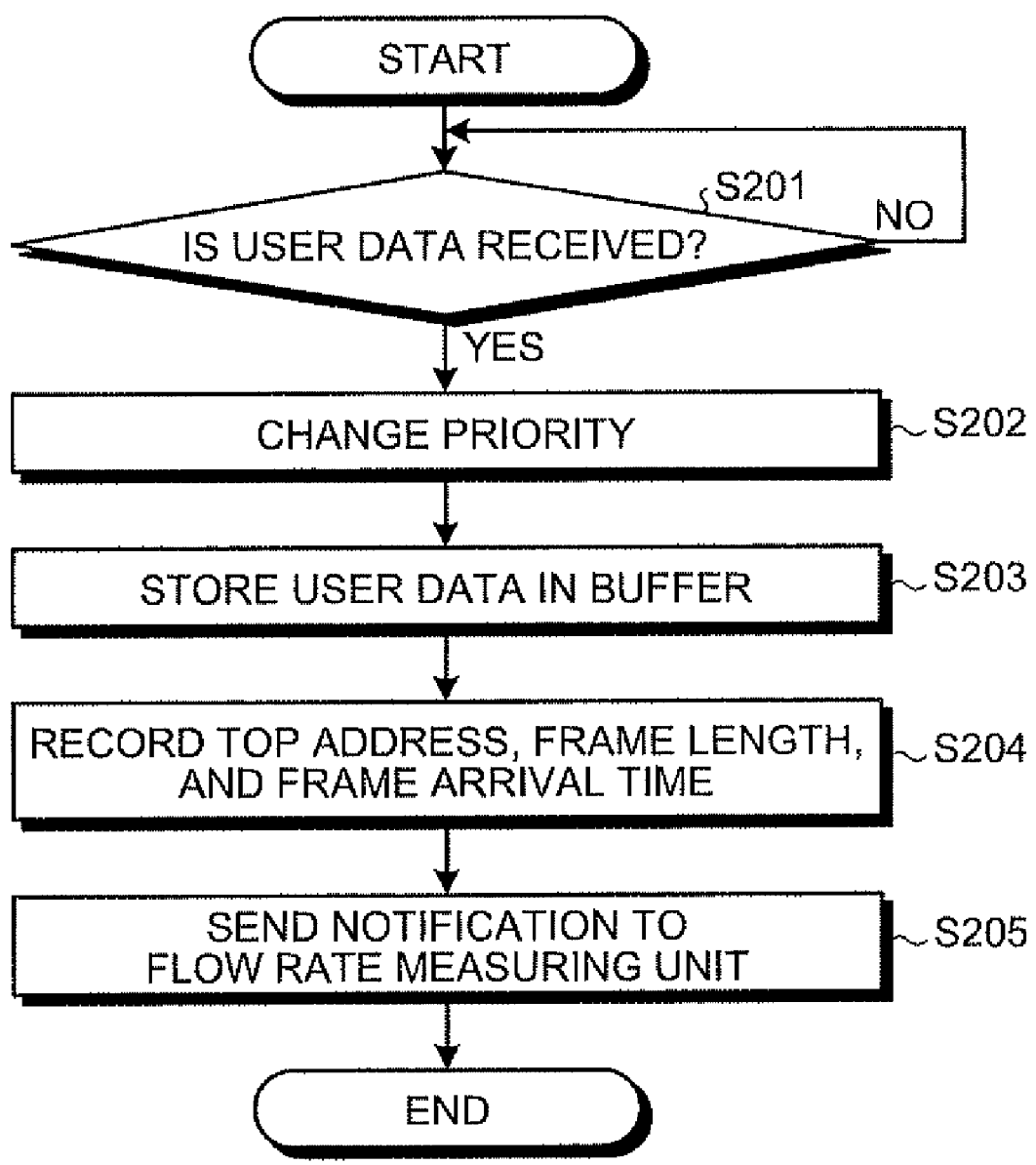
FIG. 9 is a flowchart of an example of a buffer storage process performed by the load testing system according to the first embodiment.
Figure 10:
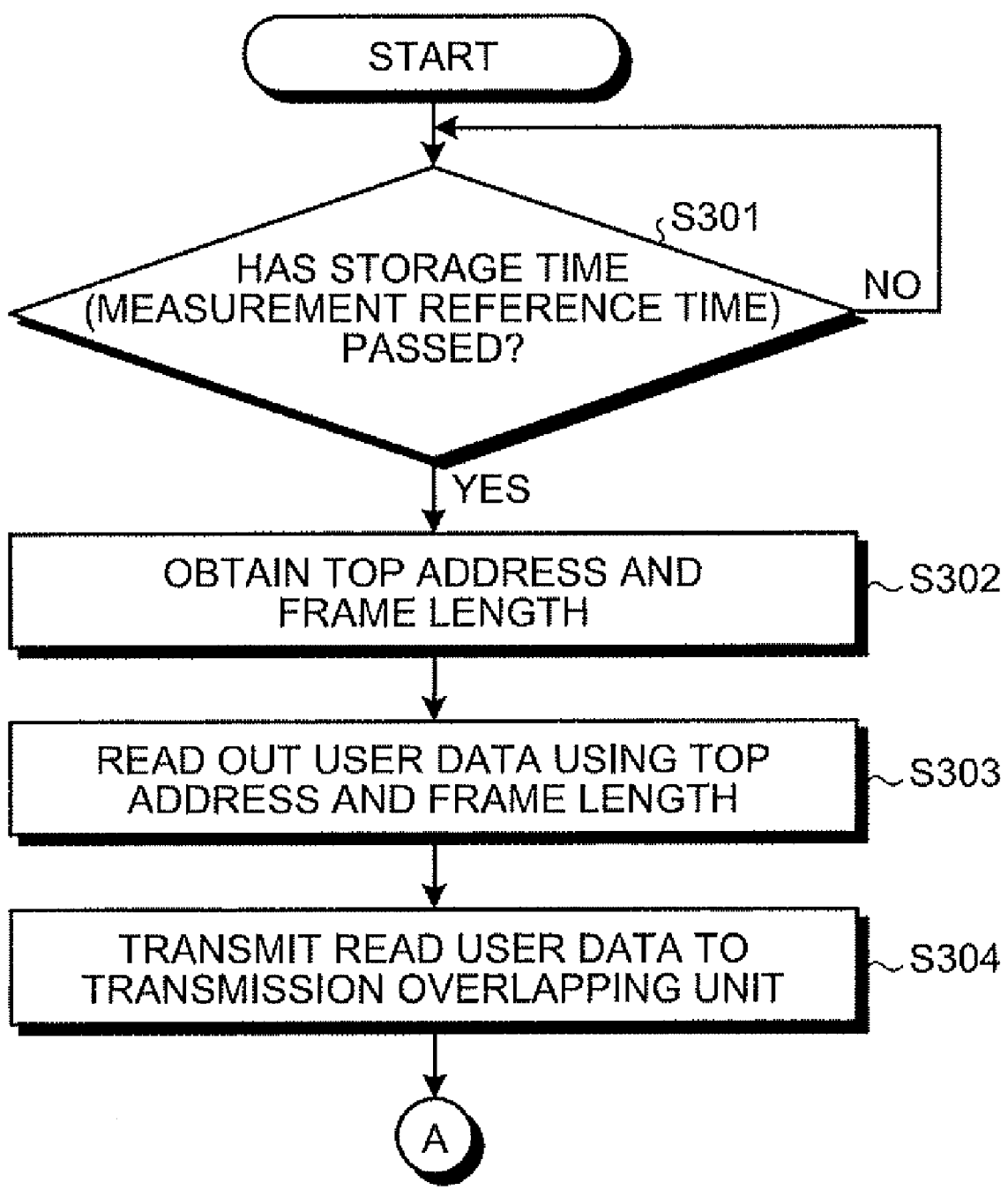
FIG. 10 is a flowchart of an example of a process, by which user data is transmitted with test data, performed by the load testing system according to the first embodiment.
Figure 11:
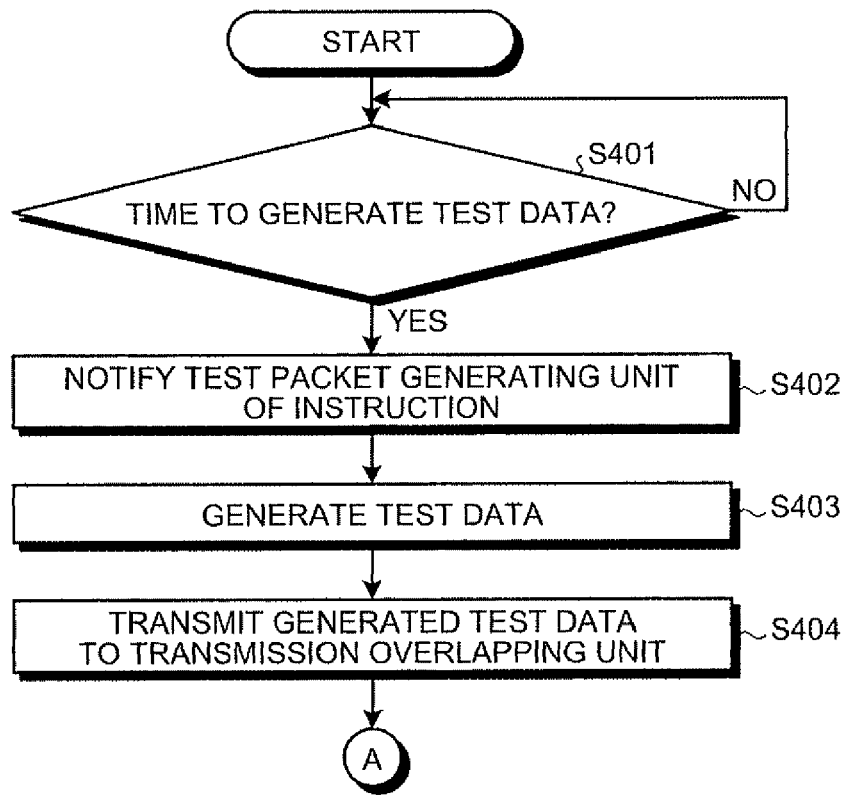
FIG. 11 is a flowchart of another example of the process, by which the user data is transmitted with the test data, performed by the load testing system according to the first embodiment.
Figure 12:
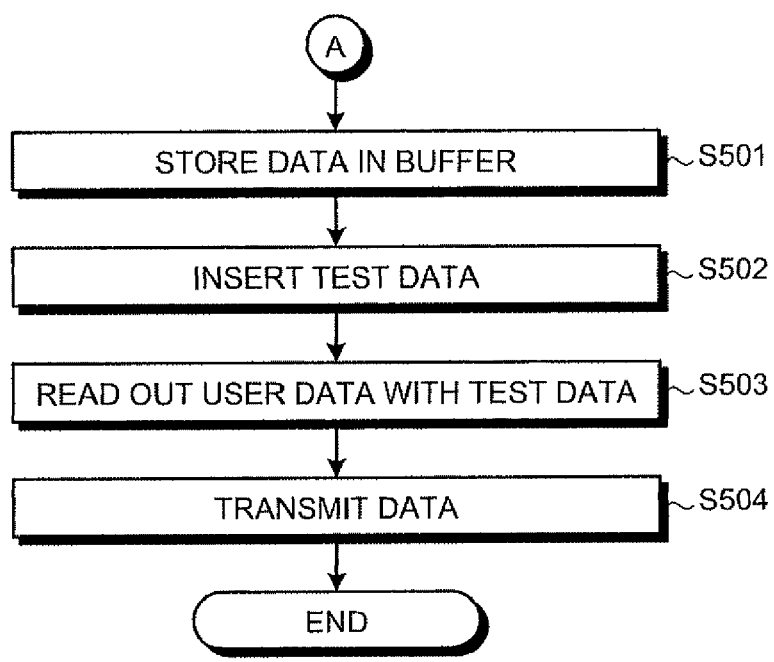
FIG. 12 is a flowchart of still another example of the process, by which the user data is transmitted with the test data, performed by the load testing system according to the first embodiment.
Figure 13:
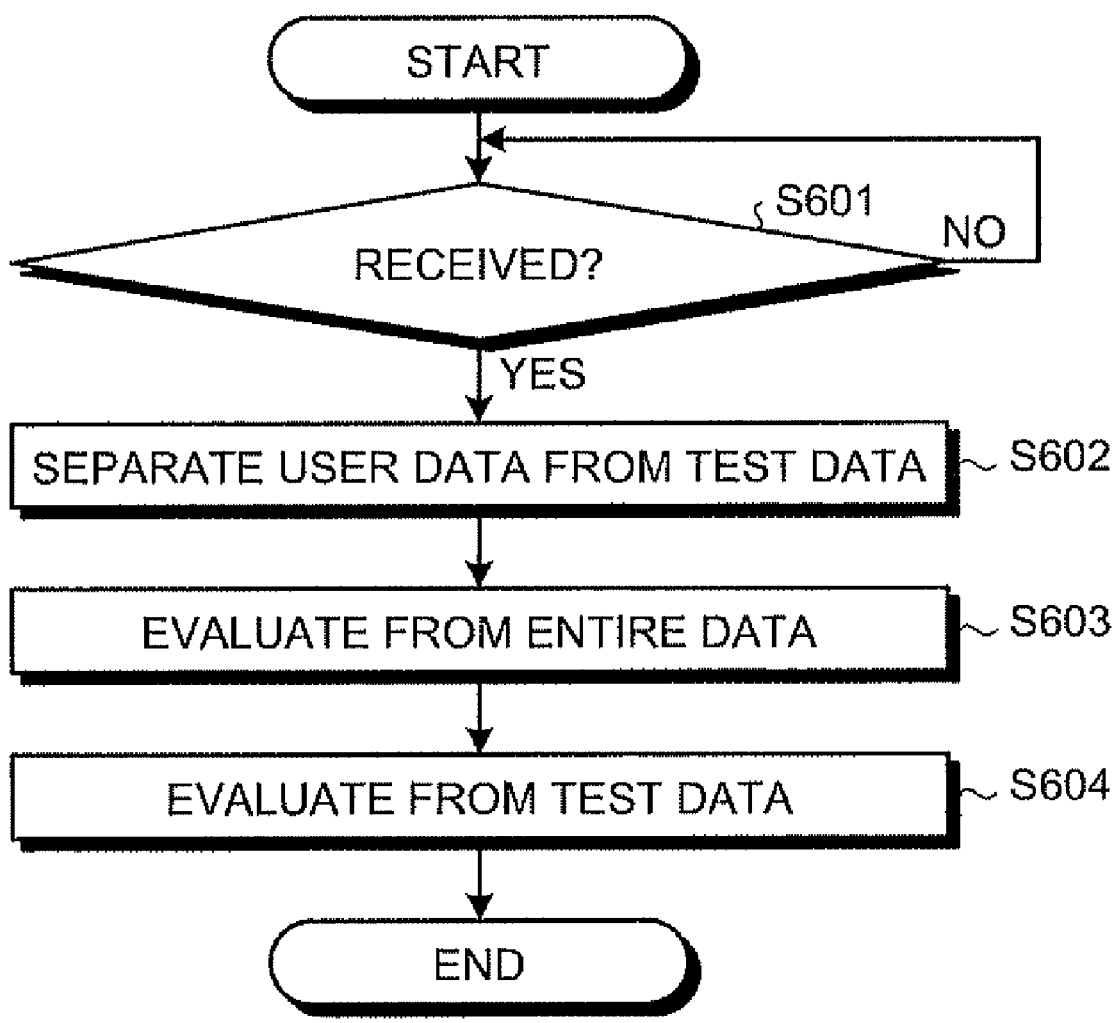
FIG. 13 is a flowchart of an example of a process performed by a reception device according to the first embodiment.

With reference to FIGS. 8 to 13, a process performed by the load testing system according to the first embodiment will be explained. An example of the entire process performed by the transmission device according to the first embodiment will be described with reference to FIG. 8. Then, with reference to FIGS. 9 to 12, an example of a process performed by the load testing system according to the first embodiment will be described. Thereafter, with reference to FIG. 13, an example of a process performed by the reception device according to the first embodiment will be described. FIG. 8 is a flowchart of an example of the entire process performed by the transmission device according to the first embodiment. FIG. 9 is a flowchart of an example of a buffer storage process performed by the load testing system according to the first embodiment. FIGS. 10 to 12 are flowcharts of an example of a process, by which user data is transmitted with test data, performed by the load testing system according to the first embodiment. FIG. 13 is a flowchart of an example of a process performed by the reception device according to the first embodiment.

With reference to FIG. 8, an example of the entire process performed by the transmission device according to the first embodiment will be explained.

As illustrated in FIG. 8, when user data is received by the transmission device 200 (transmission device receiving side port 205) (Yes at Step S101), the transmission device 200 (W unit 207) stores the user data in a buffer (Step S102). In other words, for example, the transmission device 200 (W unit 207) stores the user data in the RX packet buffer 201, and notifies the information related to the user data to the flow rate measuring unit 209.

The transmission device 200 (flow rate measuring unit 209) measures flow rate (Step S103). In other words, for example, the transmission device 200 measures the bandwidth of the user data transmitted from the user terminal in real time. The transmission device 200 (flow rate measuring unit 209) then calculates a calculation bandwidth (Step S104). For example, the flow rate measuring unit 209 calculates a calculation bandwidth (e.g., 20 Mbps) by subtracting the user bandwidth (e.g., 40 Mbps) from the evaluation bandwidth (e.g., 60 Mbps), at every measurement reference time set in advance.

The transmission device 200 (test data generating unit 210) then generates test data (Step S105). For example, the test data generating unit 210, when notified of the calculation bandwidth (e.g., 20 Mbps) by the flow rate measuring unit 209, generates the test data (e.g., 20 Mbps) that corresponds to the calculation bandwidth.

The transmission device 200 (R unit 208) also reads out the user data stored in the buffer (Step S107). For example, the transmission device 200 reads out the user data stored for the measurement reference time T.

The transmission device 200 (transmission overlapping unit 211) then transmits the user data with the test data (Step S106). In other words, the transmission overlapping unit 211 transmits the test data that corresponds to the calculated calculation bandwidth, with the user data that corresponds to the bandwidth of the user data.

With reference to FIG. 9, an example of a buffer storage process performed by the load testing system according to the first embodiment will be explained.

As illustrated in FIG. 9, when the transmission device 200 receives user data (Yes at Step S201), the W unit 207 changes the priority of the received user data (Step S202). In other words, the W unit 207 changes the priority preset in the user data to be transmitted (received), to a priority higher than the test data transmitted with the user data.

The W unit 207 then stores each user data in the buffer (Step S203). The W unit 207 records the top address, the frame length, and the frame arrival time of each of the user data in the control table 202 (Step S204). Then, the W unit 207 stores the number of bytes "100" and the Rcv Time "0" in the control table 202, by associating with the top address "0x00000000".

The W unit 207 sends a notification to the flow rate measuring unit 209 (Step S205). In other words, for example, the W unit 207 notifies the flow rate measuring unit 209 of the "frame length (the number of bytes)", the "Rcv Time", and the "End Time" of the user data, by associating with the "top address". Then, the process ends.

With reference to FIGS. 10 to 12, an example of a process, by which the user data is transmitted with the test data, performed by the load testing system according to the first embodiment will be explained.

As illustrated in FIG. 10, the R unit 208, when the storage time has passed (Yes at Step S301), in other words, for example, if the measurement reference time has passed from the "Rcv Time" stored in the control table 202, the R unit 208 obtains the "top address" and the "frame length" from the control table 202 (Step S302). Then, the R unit 208 reads out the user data stored in the RX packet buffer 201 by the W unit 207 using the "top address" and the "frame length" (Step S303), and transmits the read user data to the transmission overlapping unit 211 (Step S304).

As illustrated in FIG. 11, the flow rate measuring unit 209, upon the time to generate the test data (Yes at Step S401), in other words, for example, at every measurement reference time, notifies the test packet generating unit of the instruction to generate the test data and the calculation bandwidth (Step S402). For example, the flow rate measuring unit 209 notifies the test packet generating unit of a frame request signal and 20 Mbps.

The test data generating unit 210 then generates test data (Step S403). For example, the test data generating unit 210 generates test data, based on the instruction to generate test data and the calculation bandwidth (e.g., 20 Mbps) received from the flow rate measuring unit 209. The test data generating unit 210 then transmits the generated test data to the transmission overlapping unit 211 (Step S404).

As illustrated in FIG. 12, when the user data is transmitted from the R unit 208 (Step S304), and the test data is transmitted from the test data generating unit 210 (Step S404), the transmission overlapping unit 211 temporarily stores the data in the buffer (Step S501). In other words, for example, the transmission overlapping unit 211 (Tx buffer RW unit 213) temporarily stores the user data transmitted by the R unit 208 and the test data transmitted by the test data generating unit 210 in the Tx packet buffer 212.

The adjusting unit 214 inserts test data (Step S502). In other words, the adjusting unit 214 adjusts the timing to transmit the user data and the test data stored in the Tx packet buffer 212 by the Tx buffer RW unit 213.

Upon reaching the transmission timing, the Tx buffer RW unit 213 reads out the user data and the test data stored in the Tx packet buffer 212 (Step S503). For example, the Tx buffer RW unit 213 reads out the user data and the test data adjusted by the adjusting unit 214 at every measurement reference time. The Tx buffer RW unit 213 then transmits the read user data and the test data from the transmission device transmitting side port 206 (Step S504), thereby finishing the process (End).

With reference to FIG. 13, an example of a process performed by the reception device according to the first embodiment will be described.

As illustrated in FIG. 13, the reception device 300 (reception device receiving side port 301), on receiving the user data and the test data transmitted with the user data (Yes at Step S601), separates the user data from the test data (Step S602). For example, the reception device 300 (reception separating unit 303) determines the data assigned with the test data identification tag as the test data, and determines the data not assigned with the test data identification tag as the user data, thereby separating the user data from the test data.

The reception device 300 (entire data evaluating unit 304) evaluates from the entire data (Step S603). For example, the entire data evaluating unit 304 evaluates an execution bandwidth in the evaluation bandwidth. The reception device 300 (test data evaluating unit 305) then evaluates from the test data (Step S604). For example, the test data evaluating unit 305 detects and evaluates packet loss and jitter (fluctuation) from the received test data, thereby finishing the process (End).

According to the first embodiment, in the present load testing system, the transmission device 200 measures the bandwidth of the user data in real time, calculates the calculation bandwidth, and transmits the test data with the user data that corresponds to the bandwidth of the user data. The reception device 300 receives the user data transmitted from the transmission device 200 and the test data transmitted with the user data, and evaluates the performance of the network from the received user data and the test data. Accordingly, it is possible to perform active evaluation without incurring a negative impact on the actual network operation.

For example, the present load testing system can perform active evaluation while preventing discarding of real data. It is also possible to perform active evaluation on the network in operation. The present load testing system can also evaluate the performance of the network, by applying the theoretical max load on the network in operation. Accordingly, it is possible to periodically evaluate the performance of the network.

The transmission device 200 sets and transmits the priority of test data lower than the priority preset in the user data. Accordingly, it is possible to prevent the user data from being discarded.

The transmission device 200 changes the priority preset for the user data to be transmitted to a priority higher than the test data, and transmits the user data. Accordingly, it is possible to prevent the user data from being discarded.

The reception device 300 separates the received user data from the test data and evaluates the performance of the network only by the separated test data, or by both the received user data and the test data. Accordingly, it is possible to obtain more information for the evaluation.

The transmission device 200 assigns and transmits sequence identification information with respect to each test data to be transmitted. The reception device 300 obtains a sequence identification number from each test data being received, and evaluates if there is any test data that has not received among the transmitted test data. Accordingly, it is possible to evaluate if there is any packet loss.

The transmission device 200 assigns and transmits time information with respect to each test data to be transmitted. The reception device 300, with each test data being received, evaluates the fluctuations of data arrival interval in the network, from the time information assigned in each set of the test data and the time when each set of the test data is received. Accordingly, it is possible to evaluate the fluctuation (jitter) of the network.

Figure 14:
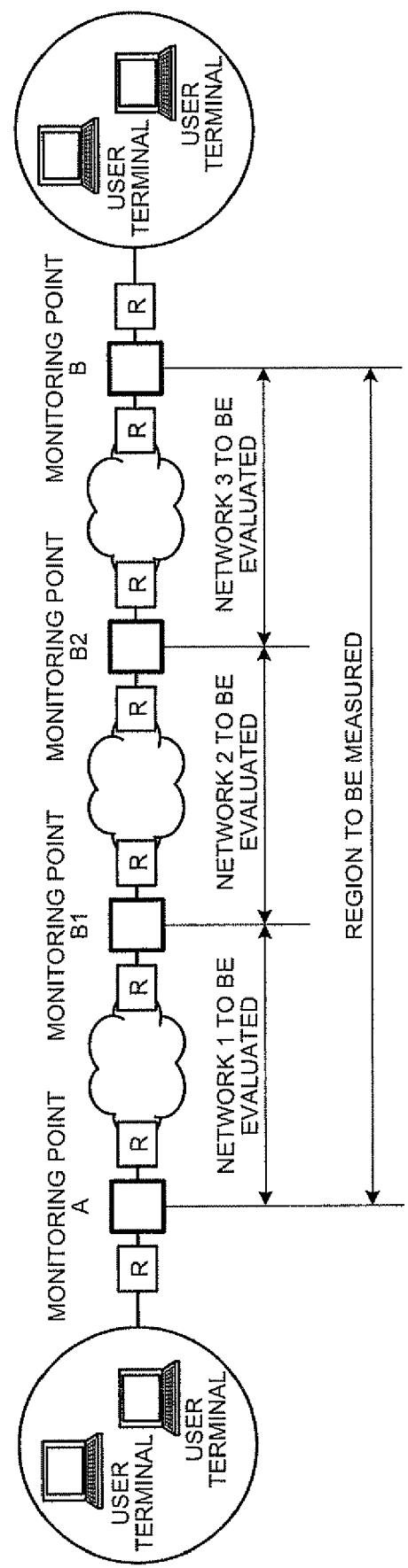
FIG. 14 is a schematic diagram for explaining characteristics of a load testing system according to a second embodiment.
Figure 15:
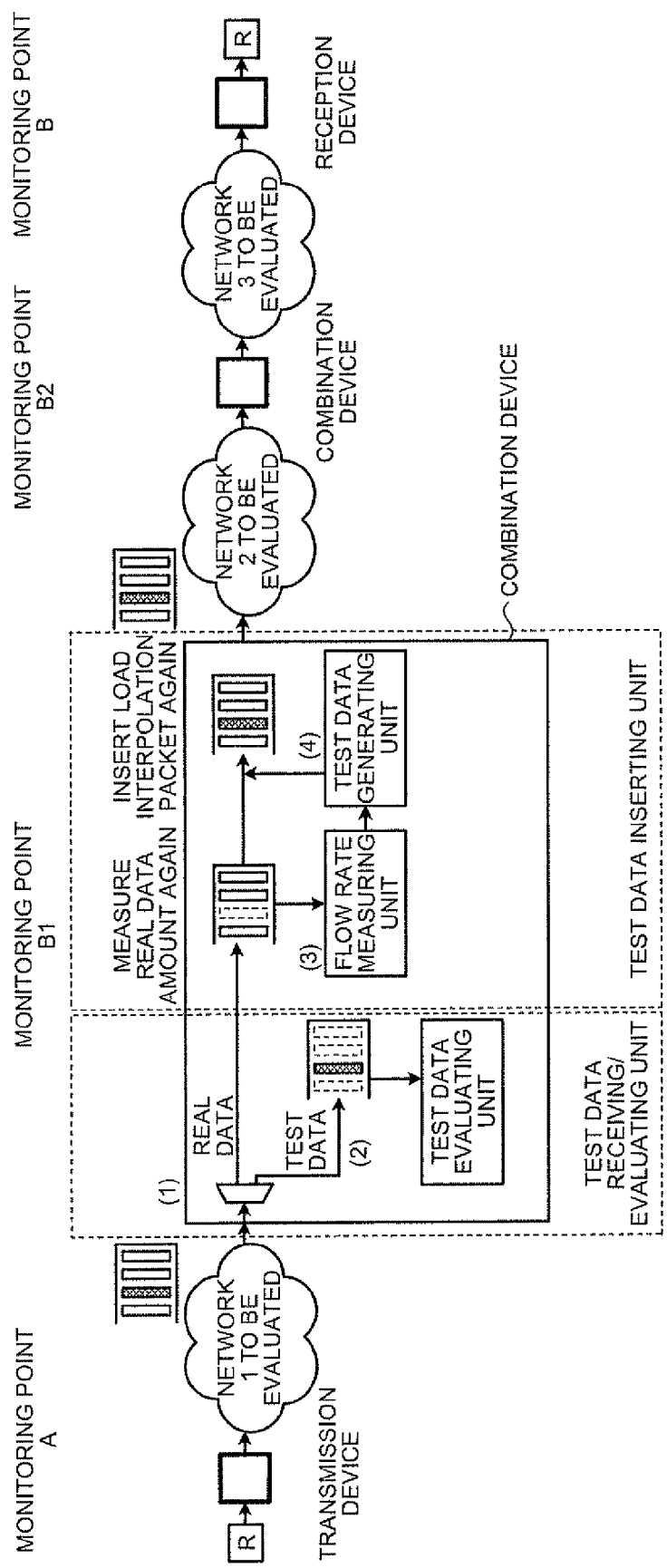
FIG. 15 is another schematic diagram for explaining characteristics of the load testing system according to the second embodiment.
Figure 16:
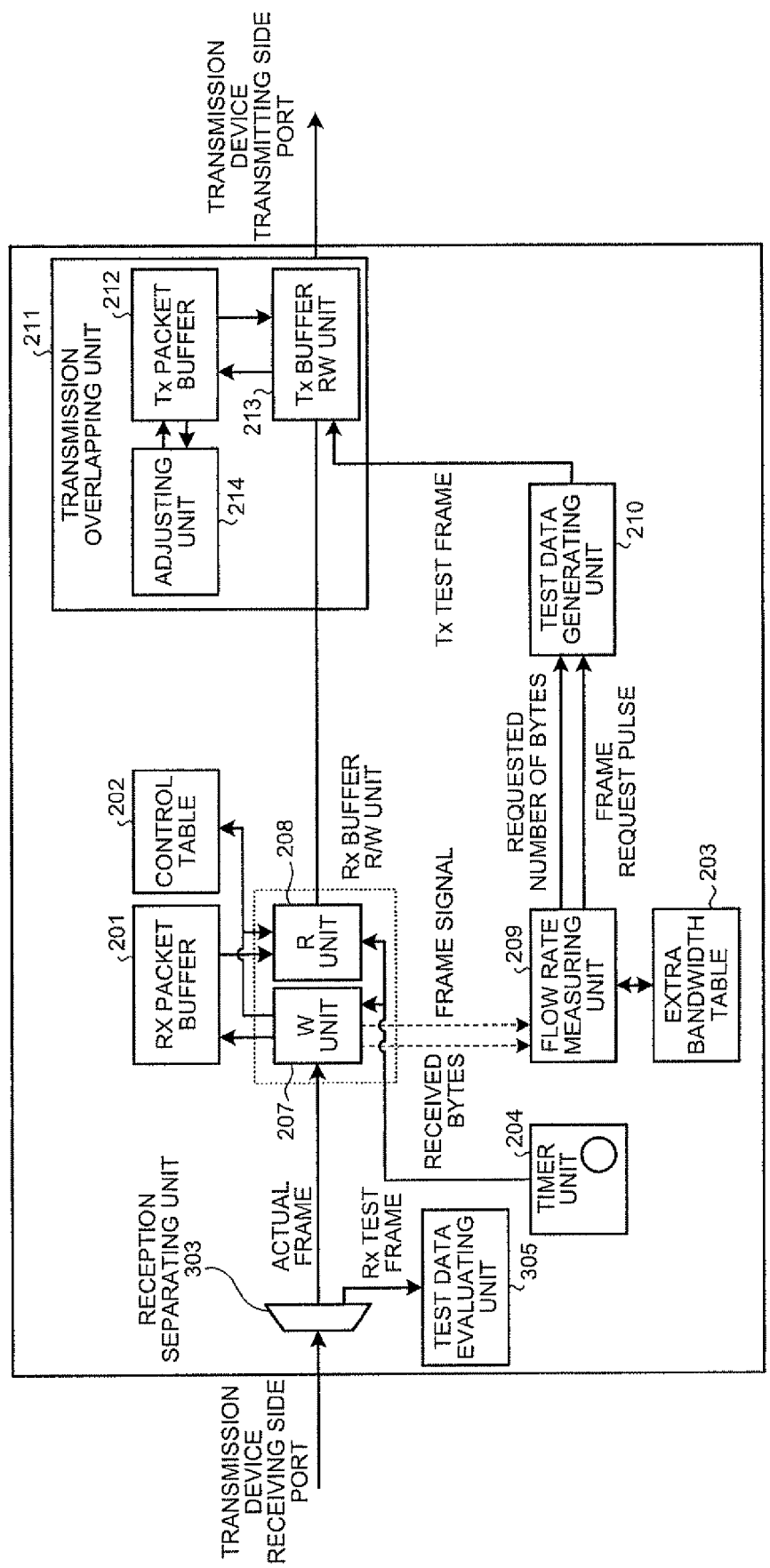
FIG. 16 is a block diagram of the load testing system according to the second embodiment.

In the first embodiment, a method of evaluating the performance of the network, of one segment specified by two monitoring points (a point where transmission device 200 is installed and a point where reception device 300 is installed) is described. However, the present invention is not limited to this, and the performance may be evaluated by installing an intermediate monitoring point, and dividing a region to be measured into a plurality of regions by the intermediate monitoring point. Therefore, in a second embodiment, with reference to FIGS. 14 to 16, a method of evaluating the performance by installing an intermediate monitoring point, and dividing a region to be measured into a plurality of regions, by the intermediate monitoring point will be described. FIGS. 14 and 15 are schematic diagrams for explaining characteristics of a load testing system according to a second embodiment. FIG. 16 is a block diagram of the load testing system according to the second embodiment. Descriptions similar to those described in the first embodiment will be omitted or simplified.

As illustrated in FIG. 14, in the load testing system according to the first embodiment, for example, the performance of the region to be measured between the monitoring point A and the monitoring point B are evaluated. In the load testing system according to the second embodiment, not only the region to be measured is collectively evaluated, but the performances of a network 1 to be evaluated, a network 2 to be evaluated, and a network 3 to be evaluated, that are separated by intermediate monitoring points (monitoring point B1 and monitoring point B2) are also evaluated.

More specifically, as illustrated in FIG. 15, a combination device that includes the function of the transmission device 200 and the function of the reception device 300 are installed at the intermediate monitoring points (in FIGS. 14 and 15, monitoring point B1 and monitoring point B2).

A configuration of the combination device will be briefly described. As illustrated in FIG. 16, the combination device has a function to insert test data (such as flow rate measuring unit 209 and test data generating unit 210) and a function to evaluate test data (e.g., test data evaluating unit 305 and entire data evaluating unit 304).

Such a combination device evaluates the performance of the network, by transmitting the test data used for evaluating the performance of the network with respect to the network that relays the user data transmitted from a user device, and by receiving the test data. The combination device receives the user data and the test data transmitted with the user data, and evaluates the performance of the network from the received user data and the test data. The combination device also measures the bandwidth of the received user data transmitted from the user device in real time, calculates the calculation bandwidth from the evaluation bandwidth, and transmits the test data with the user data.

Such a combination device, as indicated by (1) in FIG. 15, receives the user data overlapped with the test data as the first embodiment. Then as indicated by (2) in FIG. 15, the combination device temporarily separates and terminates the inserted test data, and evaluates using the test data. As indicated by (3) in FIG. 15, the combination device measures the bandwidth of the user data again, and as indicated by (4) in FIG. 15, generates test data, and inserts into the user data. Then, the combination device transmits the user data with the test data.

In the load testing system according to the second embodiment, the monitoring point installed with the combination device that has both functions of the transmission device 200 and the reception device 300 is inserted over a plurality of networks to be evaluated. Accordingly, it is possible to continuously evaluate over the networks to be evaluated. In other words, by installing a number of intermediate monitoring points in stages, it is possible to realize a network performance evaluation with higher accuracy, and for example, enabling to easily detect a bottleneck of the network.

For example, compared with the method of the first embodiment, the network to be measured is divided into a plurality of regions, and the performance of the network is evaluated for each region. Accordingly, if a bottleneck of the network is detected, it is possible to easily detect from which divided region the bottleneck is detected.

Figure 17:
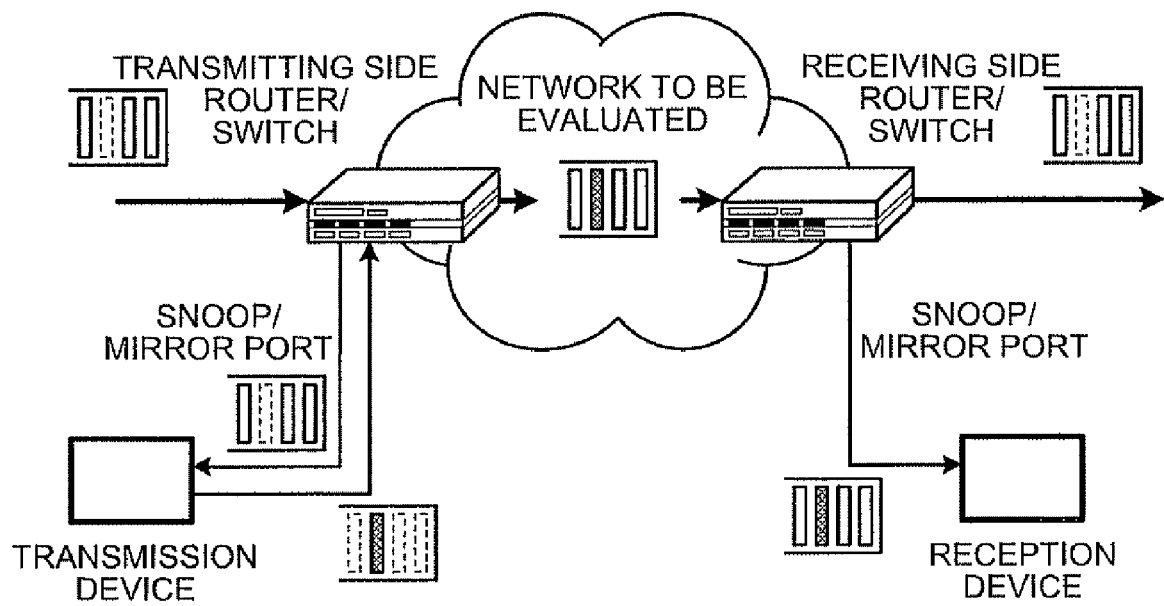
FIG. 17 is a schematic diagram for explaining characteristics of a load testing system according to a third embodiment.
Figure 18:
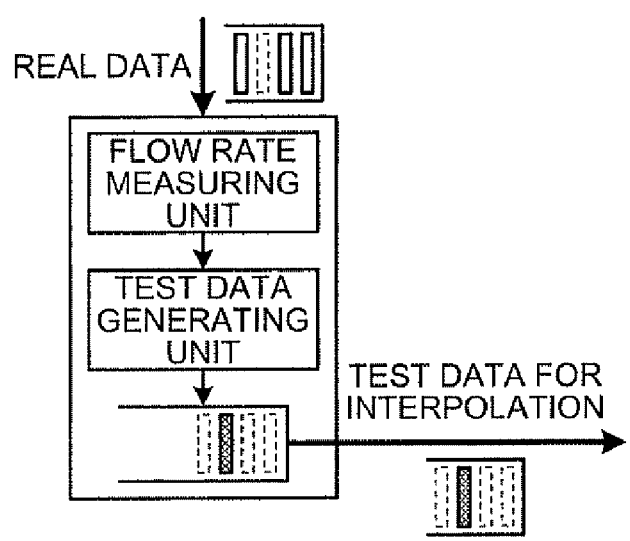
FIG. 18 is a schematic diagram for explaining a transmission device according to the third embodiment.

The embodiment is brought into practice by installing (connecting) the transmission device 200 and the reception device 300 between the user terminal (e.g., router) and the network. Namely, the embodiment is brought into practice by changing the configuration of the network. Meanwhile, the embodiment may also be brought into practice without changing the configuration of network. In a third embodiment, this case will be explained with reference to FIGS. 17 and 18. FIG. 17 is a schematic diagram for explaining characteristics of a load testing system according to the third embodiment. FIG. 18 is a schematic diagram for explaining a transmission device 200 according to the third embodiment. Descriptions similar to those described in the embodiments will be omitted or simplified.

As illustrated in FIG. 17, the load testing system according to the third embodiment includes a transmitting side router/switch, a receiving side router/switch, a network to be evaluated specified by the transmitting side router/switch and the receiving side router/switch, a transmission device 200 according to the third embodiment connected to a snoop port/mirror port included in the transmitting side router/switch, and a reception device 300 according to the third embodiment connected to a snoop port/mirror port included in the receiving side router/switch.

The transmitting side router/switch according to the third embodiment includes a snoop port and a mirror port, and for example, transmits a copy of the received user data to the transmission device 200 according to the third embodiment.

In the transmission device 200 according to the third embodiment, as illustrated in FIG. 18, the flow rate measuring unit 209 measures the bandwidth of the user data received from the transmitting side router/switch, and calculates the calculation bandwidth. The test data generating unit 210 then generates test data, and transmits the test data to the transmitting side router/switch.

At this time, the test data generating unit 210, with respect to each test data to be generated, sets a priority flag unique from the user data. In other words, the test data generating unit 210 sets the priority by which the test data can be distinguished from the user data, and that the receiving side router/switch, which will be described later, can distinguish.

The transmitting side router/switch transmits the received user data with the test data transmitted from the transmission device 200 (test data generating unit 210) according to the third embodiment. At this time, a conventional transmitting side router/switch may be used. Accordingly, the transmitting side router/switch transmits the received user data and the test data received from the transmission device 200 according to the third embodiment, every time they are received (or after temporarily stored in buffer), without adjusting the transmission timing, as the adjusting unit 214 according to the first embodiment.

The receiving side router/switch receives the user data and the test data relayed through the network and transmitted by the transmitting side router/switch. The transmitting side router/switch includes a snoop port and a mirror port, and transmits a copy of the received user data and the test data to the reception device 300 according to the third embodiment.

The receiving side router/switch determines the priority assigned to each test data by the test data generating unit 210, discards each test data, and only transmits the user data.

The reception device 300 according to the third embodiment evaluates the performance of the network, using the user data and the test data received from the receiving side router/switch.

In this manner, according to the third embodiment, the present load testing system can realize the function of evaluating the network, without changing the configuration of the network in operation. This is enabled by linking with a device such as a router and a switch, and by using a snoop port and a mirror port.

Fourth Embodiment

While some embodiments have been described, it is to be understood that various other modifications may be made thereto. As described below, the other embodiments will now be described. Descriptions similar to those described in the embodiments will be omitted or simplified.

In the first embodiment, the bandwidth of real data is measured, and the test data is generated to transmit with the real data. Then, (1) the priority of the test data is set lower than that of the user data, (2) the priority of the user data is set higher than that of the test data, (3) the entire evaluation is performed while evaluating from the test data, (4) packet loss is evaluated using a sequence number, and (5) jitter (fluctuation) is evaluated using a time stamp. However, the present invention is not limited to this. More specifically, only one or several of (1) to (5) may be performed, instead of performing all of (1) to (5).

Of the processes described above, all or part of the processes explained as being performed automatically can be performed manually (operation of evaluating the performance of the network may be performed manually, by analyzing the received test data and the like). The processing procedures, the control procedures, specific names, and information including various data and parameters described above and illustrated in the drawings (e.g., FIGS. 2 to 13, FIG. 15, FIG. 16, and FIG. 18) can be changed as required unless otherwise specified.

The constituent elements of the apparatus are functionally conceptual, and need not be physically configured as illustrated. In other words, the specific mode of dispersion and integration of the constituent elements is not limited to the ones illustrated in the drawings, and the constituent elements, as a whole or in part, can be divided or integrated either functionally or physically based on various types of loads or use conditions. For example, using the example in FIG. 3, the flow rate measuring unit 209 may be separated into a configuration unit that measures the bandwidth of the user data, and a calculating unit that calculates the calculation bandwidth, or the control table 202 and the extra bandwidth table 203 may be integrated.

Figure 19A:
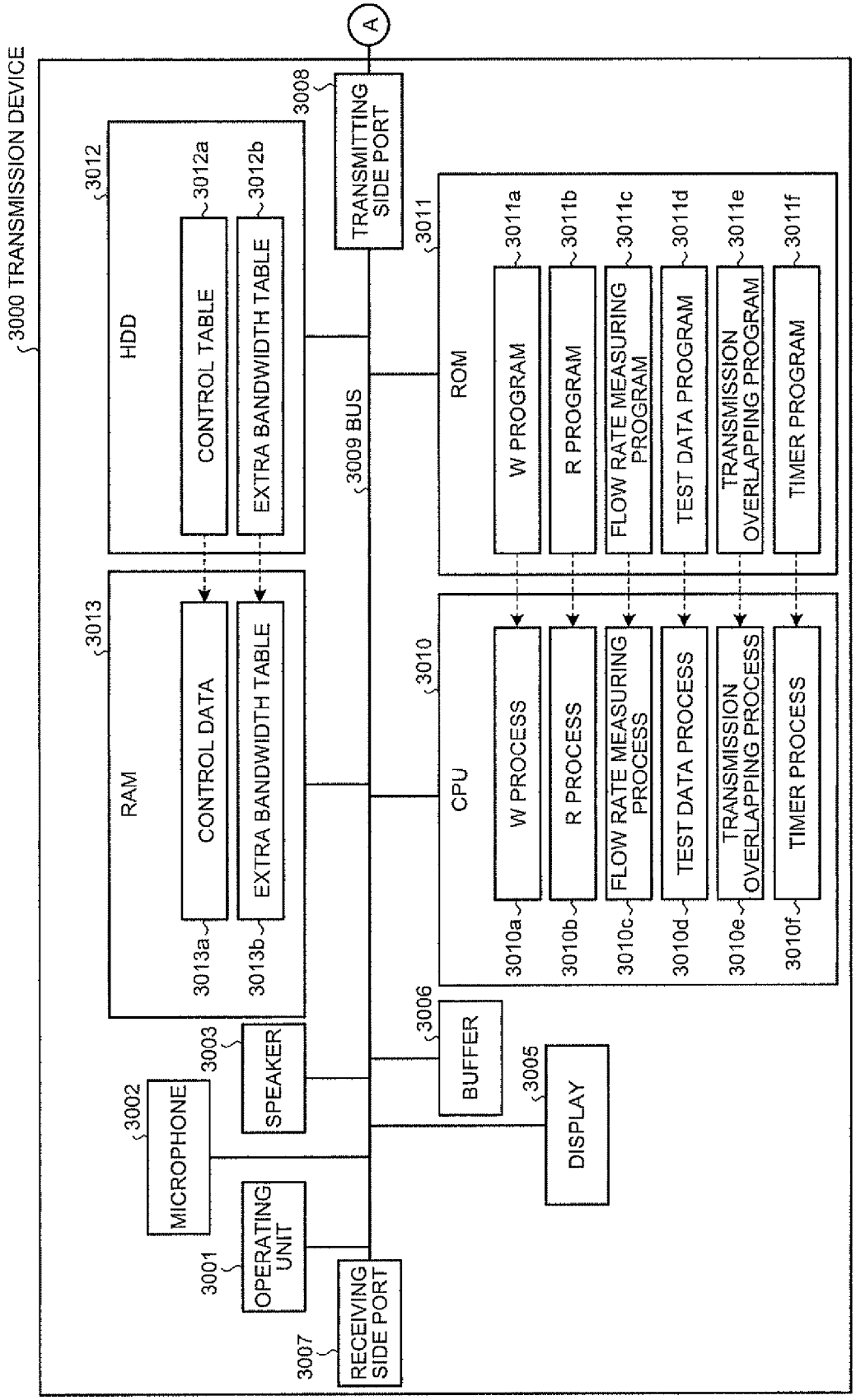
FIG. 19A is a schematic diagram for explaining a computer program performed by the load testing system according to the first embodiment.
Figure 19B:
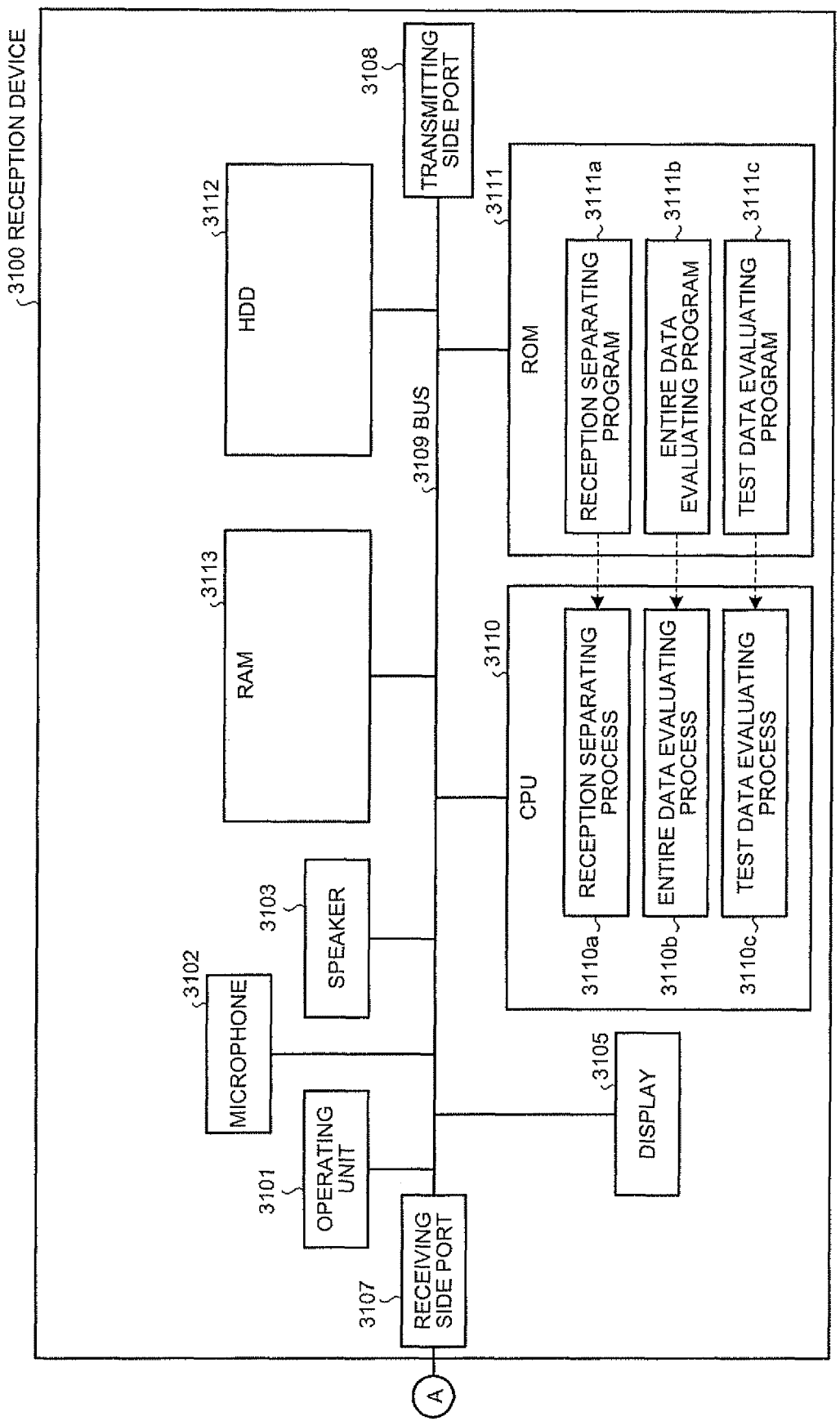
FIG. 19B is another schematic diagram for explaining the computer program performed by the load testing system according to the first embodiment.
Figure 20:
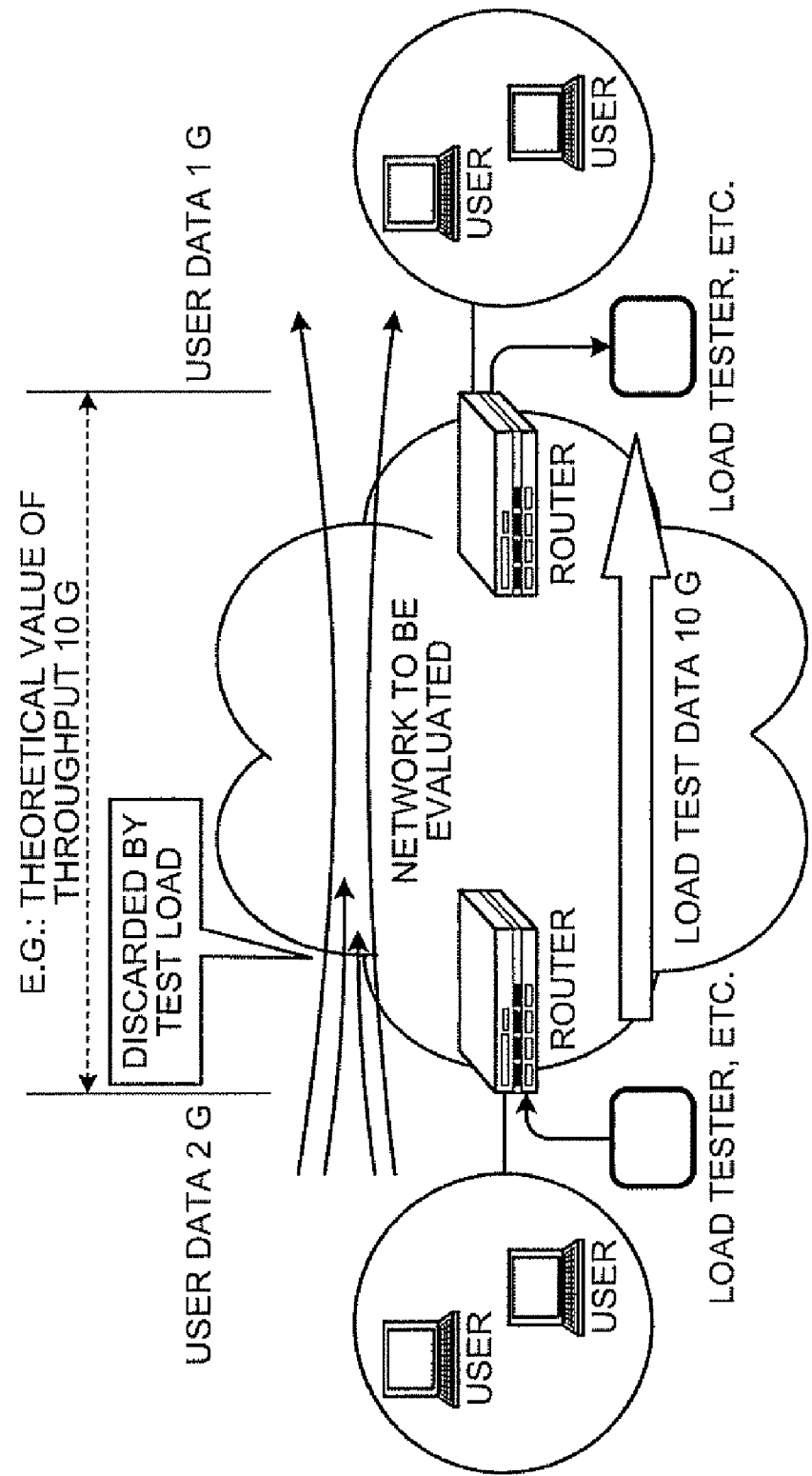
FIG. 20 is a schematic diagram for explaining a conventional technology.

In the first embodiment, various processes are realized by hardware logic; however, a computer program prepared in advance can be executed on a computer to implement the same processes. In the following, with reference to FIGS. 19A and 19B, an example will be described of a computer that executes such a computer program (hereinafter, "load testing system program") implementing the same function as the load testing system according to the first embodiment. FIGS. 19A and 19B are schematic diagrams for explaining the load testing system program performed by the load testing system according to the first embodiment.

As illustrated in FIG. 19A, a transmission device 3000 (the transmission device 200 according to the first embodiment) includes an operating unit 3001, a microphone 3002, a speaker 3003, a display 3005, a buffer 3006, a receiving side port 3007, a transmitting side port 3008, a central processing unit (CPU) 3010, a read-only memory (ROM) 3011, a hard disk drive (HDD) 3012, and a random access memory (RAM) 3013, connected by a bus 3009 and the like.

The ROM 3011 stores therein a control program that exercises the similar function to that of the W unit 207, the R unit 208, the flow rate measuring unit 209, the test data generating unit 210, the transmission overlapping unit 211, and the timer unit 204. In other words, as illustrated in FIG. 19A, the ROM 3011 stores therein a W program 3011a, an R program 3011b, a flow rate measuring program 3011c, a test data program 3011d, a transmission overlapping program 3011e, and a timer program 3011f. The programs 3011a to 3011f may be appropriately integrated or dispersed, similar to the respective constituents of the load testing system illustrated in FIG. 3.

The CPU 3010 reads out the programs 3011a to 3011f from the ROM 3011 and executes. Accordingly, as illustrated in FIG. 19A, each of the programs 3011a to 3011f functions as a W process 3010a, an R process 3010b, a flow rate measuring process 3010c, a test data process 3010d, a transmission overlapping process 3010e, and a timer process 3010f. Each of the processes 3010a to 3010f respectively corresponds to the W unit 207, the R unit 208, the flow rate measuring unit 209, the test data generating unit 210, the transmission overlapping unit 211, and the timer unit 204 illustrated in FIG. 3.

The HDD 3012 includes a control table 3012a and an extra bandwidth table 3012b. Each of the tables 3012a and 3012b respectively corresponds to the control table 202 and the extra bandwidth table 203 illustrated in FIG. 3.

The CPU 3010 reads out the control table 3012a and the extra bandwidth table 3012b and stores in the RAM 3013. The CPU 3010 executes a load testing system program using control data 3013a and extra bandwidth data 3013b stored in the RAM 3013.

As illustrated in FIG. 19B, a reception device 3100 according to the first embodiment includes an operating unit 3101, a microphone 3102, a speaker 3103, a display 3105, a receiving side port 3107, a transmitting side port 3108, a CPU 3110, a ROM 3111, a HDD 3112, and a RAM 3113 connected by a bus 3109 and the like.

The ROM 3111 stores therein a control program that exercises the similar function to that of the reception separating unit 303, the entire data evaluating unit 304, and the test data evaluating unit 305 illustrated in the first embodiment. In other words, as illustrated in FIG. 19B, the ROM 3111 stores therein a reception separating program 3111a, an entire data evaluating program 3111b, and a test data evaluating program 3111c in advance. The programs 3111a to 3111c may be appropriately integrated or dispersed, similar to the respective constituents of the load testing system illustrated in FIG. 3.

The CPU 3110 reads out the programs 3111a to 3111c from the ROM 3111 and executes. Accordingly, as illustrated in FIG. 19B, each of the programs 3111a to 3111c functions as a reception separating process 3110a, an entire data evaluating process 3110b, and a test data evaluating process 3110c. Each of the processes 3110a to 3110c respectively corresponds to the reception separating unit 303, the entire data evaluating unit 304, and the test data evaluating unit 305 illustrated in FIG. 3.

A computer program prepared in advance can be executed on a computer, such as a personal computer or a work station, to realize the load testing system described above. The computer program may be distributed via a network such as the Internet. The computer program may be stored in a computer-readable recording medium such as a hard disk, a flexible disk (FD), a compact disk read only memory (CD-ROM), a magnetooptic disk (MO), and a digital versatile disk (DVD), and read out from the recording medium by a computer to be executed.

As set forth hereinabove, according to an embodiment, it is possible to perform active evaluation without incurring a negative impact on the actual network operation. Moreover, it is possible to prevent the user data from being discarded. Furthermore, it is possible to obtain more information, and to evaluate if there is any packet loss.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A load testing system comprising:
   a transmission device that transmits test data used to evaluate performance of a network that relays user data transmitted from a user terminal; and
   a reception device that receives the test data from the transmission device and evaluates the performance of the network, wherein
   the transmission device includes:
      a first processor that is operative
         to store the user data in a buffer, when receiving the user data transmitted from the user terminal,
         to measure, in real time, a bandwidth of the user data transmitted from the user terminal and stored in the buffer,
         to calculate a calculation bandwidth by subtracting the bandwidth of the measured user data from an evaluation bandwidth preset to evaluate the performance of the network, and
      a transmitter that transmits the test data corresponding to the calculated calculation bandwidth with the user data corresponding to the bandwidth of the measured user data stored in the buffer, and
   the reception device includes:
      a receiver that receives the user data and the test data transmitted with the user data from the transmitter, and
      a second processor that is operative to evaluate the performance of the network based on the user data and the test data received by the receiver.

2. The load testing system according to claim 1, wherein
   the network relays data based on priority of the data,
   the first processor is operative to set a priority of the test data to be transmitted by the transmitter to be lower than a preset priority of the user data, and
   the transmitter transmits the calculated test data having the set priority.

3. The load testing system according to claim 1, wherein
   the network relays data based on priority of the data,
   the second processor is operative to change a preset priority of the user data to be transmitted to a priority higher than the priority of the test data, and
   the transmitter transmits the user data corresponding to the bandwidth of the user data and having the changed priority.

4. The load testing system according to claim 1, wherein
   the second processor is operative
   to separate the user data and the test data received by the receiver, and
   to evaluate the performance of the network based on the separated test data or both the user data and the test data.

5. The load testing system according to claim 1, wherein
   the first processor is operative to assign sequence identification information to each of sets of test data, the sequence identification information uniquely identifying a sequence of the sets of test data to be transmitted,
   the transmitter transmits the user data with the sets of the assigned test data, and
   the second processor is operative to obtain the sequence identification information from each of the sets of the test data, and to evaluate whether there is any test data not received, among the sets of the transmitted test data.

6. The load testing system according to claim 1, wherein
   the first processor is operative to assign time information to each of sets of test data, the time information indicating time at which each of sets of test data is transmitted,
   the transmitter transmits the user data with the sets of the test data assigned the time information, and
   the second processor is operative to evaluate fluctuations of data arrival interval in the network based on the time information assigned to the sets of the test data and the time when each of the sets of the test data is received.

7. A load testing apparatus that transmits test data used to evaluate performance of a network that relays user data transmitted from a user terminal, and receives test data to evaluate the performance of the network, the load testing apparatus comprising:
   a receiver that receives the user data and the test data transmitted with the user data;
   a processor that is operative
      to evaluate the performance of the network based on the user data and the received test data;
      to store the user data in a buffer, when receiving the user data transmitted from the user terminal,
      to measure, in real time, a bandwidth of the user data transmitted from the user terminal and received by the receiver; and
      to calculate a calculation bandwidth by subtracting the bandwidth of the measured user data from an evaluation bandwidth preset to evaluate the performance of the network; and
   a transmitter that transmits the test data corresponding to the calculated calculation bandwidth with the user data corresponding to the bandwidth of the measured user data stored in the buffer.

8. A load testing apparatus that transmits test data used to evaluate performance of a network that relays user data transmitted from a user terminal to a reception device that receives the test data to evaluate the performance of the network, the load testing apparatus comprising:
   a processor that is operative
      to store the user data in a buffer, when receiving the user data transmitted from the user terminal,
      to measure, in real time, a bandwidth of the user data transmitted from the user terminal and stored in the buffer;
      to calculate a calculation bandwidth by subtracting the bandwidth of the measured user data from an evaluation bandwidth preset to evaluate the performance of the network, and
   a transmitter that transmits the test data corresponding to the calculated calculation bandwidth with the user data corresponding to the bandwidth of the measured user data stored in the buffer.

* * * * *